(12) United States Patent
Dowden et al.

(10) Patent No.: US 10,945,311 B1
(45) Date of Patent: Mar. 9, 2021

(54) HIGH TEMPERATURE SUBSTRATE HEATER FOR USE IN HIGH AND ULTRA-HIGH VACUUM SYSTEMS

(71) Applicant: LOS ALAMOS NATIONAL SECURITY, LLC, Los Alamos, NM (US)

(72) Inventors: Paul Dowden, Los Alamos, NM (US); Quanxi Jia, Buffalo, NY (US)

(73) Assignee: Triad National Security, LLC, Los Alamos, NM (US)

( * ) Notice: Subject to any disclaimer, the term of this patent is extended or adjusted under 35 U.S.C. 154(b) by 444 days.

(21) Appl. No.: 15/801,261

(22) Filed: Nov. 1, 2017

(51) Int. Cl.
*H05B 3/08* (2006.01)
*H05B 3/30* (2006.01)
*B23K 20/00* (2006.01)

(52) U.S. Cl.
CPC .............. *H05B 3/08* (2013.01); *B23K 20/00* (2013.01); *H05B 3/30* (2013.01); *H05B 2203/002* (2013.01); *H05B 2203/017* (2013.01)

(58) Field of Classification Search
CPC ... H05B 3/08; H05B 3/30; H05B 3/20; H05B 3/22; H05B 3/262; H05B 3/28; H05B 3/68; H05B 3/80; H05B 2203/002; H05B 2203/017; H05B 2203/003; H05B 2203/004; H05B 2203/007; H05B 2203/009; H05B 2203/028; B23K 20/00
See application file for complete search history.

(56) References Cited

U.S. PATENT DOCUMENTS 6,037,574 A * 3/2000 Lanham et al.

* cited by examiner

*Primary Examiner* — Shawntina T Fuqua
(74) *Attorney, Agent, or Firm* — Lewis Roca Rothgerber Christie LLP

(57) ABSTRACT

A braze-free substrate heating device including a heater block body, a heater block lid, and a heating element. The heating element sits inside the heater block body. The heater block lid is on the heating element, such that the heating element is sandwiched between the heater block lid and the floor of the heater block body. The heating element is held in place by compressing the heater block lid into the heater block body and attaching the heater block lid to the top of the heater block body so that the heating element is fully supported over its surface area, and can maintain uniform thermal contact with the heater block lid and heater block body over its entire surface area.

19 Claims, 18 Drawing Sheets

190

190

280

HIGH TEMPERATURE SUBSTRATE HEATER FOR USE IN HIGH AND ULTRA-HIGH VACUUM SYSTEMS

STATEMENT REGARDING FEDERALLY SPONSORED RESEARCH OR DEVELOPMENT

The United States government has rights in this invention pursuant to Contract No. DE-AC52-06NA25396 between the United States Department of Energy and Los Alamos National Security, LLC for the operation of Los Alamos National Laboratory.

BACKGROUND

Platen type (flat platform) heating assemblies are used as substrate heating surfaces in vacuum or low-pressure deposition systems to heat substrates in order to control the microstructure, electronic, and physical properties of material being grown on such substrates. Such heating devices are often made of a resistive heating element bonded to a thermally conductive plate via a brazing metal-joining process.

However, the effectiveness of heating devices manufactured by braze-processing is limited. For example, the range of operating temperatures of the heating device, and in particular, the maximum available operating temperature, may be limited due to undesirable vaporization of the heating device materials, including the braze alloy used to bond the resistive heating element to the conductive plate, during high temperature and/or lower pressure heating. Such vaporization of the braze alloy may result in mechanical instability of the heating element and formation of local hot spots that can reduce the lifetime of the heating device. In addition, such heating devices manufactured by braze-processing may introduce contaminants derived from the vaporized braze alloy into the processing chamber used to house the heating device, particularly in high temperature and low pressure environments. The latter is an especially important issue when high purity materials are desired, for example, in electronic applications, because such contaminants can degrade or alter the properties of the material being grown.

SUMMARY

According to embodiments of the present disclosure, a braze-free device for heating a substrate includes: a heater block body, a heater block lid on the heater block body; and a heating element between the heater block lid and the heater block body; the heating element being compressed between the heater block body and the heater block lid along a first direction between the heater block lid and the heater block body to deform the heating element along the first direction, the heating element being in continuous physical and thermal contact with the heater block lid and the heater block body without including a braze alloy.

In some embodiments, the first direction may be a vertical direction, and the heating element may be in substantially continuous surface contact with an upper inside surface of the heater block body and an lower inside surface of the heater block lid. In some embodiments, the heating element may include a resistive heating wire coiled in a plane.

In some embodiments, the first direction may be a radial direction, and the heating element may be in substantially continuous surface contact with a convex inside surface of the heater block body and a concave inside surface of the heater block lid. The heating element may include a resistive heating wire coiled around a cylinder.

In some embodiments, the heating element may include a resistive heating wire having an outer protective sheath. A compressed outer diameter of the resistive heating wire in the first direction may be about 2.5% to about 20% of an uncompressed outer diameter of the resistive heating wire. In some embodiments, the compressed outer diameter of the resistive heating wire in the first direction may be about 5% to about 7% of the uncompressed outer diameter of the resistive heating wire.

In some embodiments, the outer protective sheath, the heater block body, and the heater block lid may each be made of a high temperature metal or alloy having a coefficient of thermal expansion. The coefficients may vary by (e.g., have a difference of) about 0% to about 10%. In some embodiments, the coefficients may be substantially identical.

In some embodiments, the high temperature metal or alloy may include molybdenum (Mo), chromium (Cr), nickel (Ni), tungsten (W), tantalum (Ta), titanium (Ti), cobalt (Co), iron (Fe), niobium (Nb), and mixtures thereof.

In some embodiments, the heater block body or the heater block lid may include an inner spacer to fill the lateral space around the lateral perimeter of the heating element.

In some embodiments, the heating element may be further compressed along a second direction, the second direction being perpendicular to the first direction.

According to embodiments of the present disclosure, a method of constructing a substrate heating device without brazing includes: coiling a resistive heating wire to form a heating element, the resistive heating wire having an outer protective sheath; placing the heating element between a heater block body and a heater block lid; compressing the heating element between the heater block body and the heater block lid along a first direction between the heater block body and the heater block lid to deform the heating element along the first direction; forming substantially continuous physical and thermal contacts between the heating element and the heater block lid and the heating element and the heater block body without including a braze alloy; and attaching the heater block lid to the heater block body.

In some embodiments, the resistive heating wire may be coiled in a plane and the first direction may be a vertical direction. The contacts may be formed with an upper inside surface of the heater block body and a lower inside surface of the heater block lid.

In some embodiments, the resistive heating wire may be coiled around the heater block body and the first direction may be a radial direction. The contacts may be formed with a convex inside surface of the heater block body and a concave inside surface of the heater block lid.

In some embodiments, compressing the heating element between the heater block body and the heater block lid may compress an outer diameter of the resistive heating wire in the first direction by about 2.5% to about 20%. In some embodiments, compressing the heating element between the heater block body and the heater block lid may compress the outer diameter of the resistive heating wire in the first direction by about 5% to about 7%.

In some embodiments, the outer protective sheath, the heater block body, and the heater block lid may each be made of a high temperature metal or alloy having a coefficient of thermal expansion. The coefficients may vary by (e.g., have a difference of) about 0% to about 10%.

In some embodiments, the heater block body or the heater block lid may include an inner spacer to fill the lateral space around the lateral perimeter of the heating element.

In some embodiments, the attaching the heater block lid to the heater block body may include fusion welding the heater block lid to the heater block body under compression.

BRIEF DESCRIPTION OF THE DRAWINGS

These and other features and advantages of the present disclosure will be better understood by reference to the following detailed description when considered in conjunction with the accompanying drawings.

DETAILED DESCRIPTION

Figure 1:
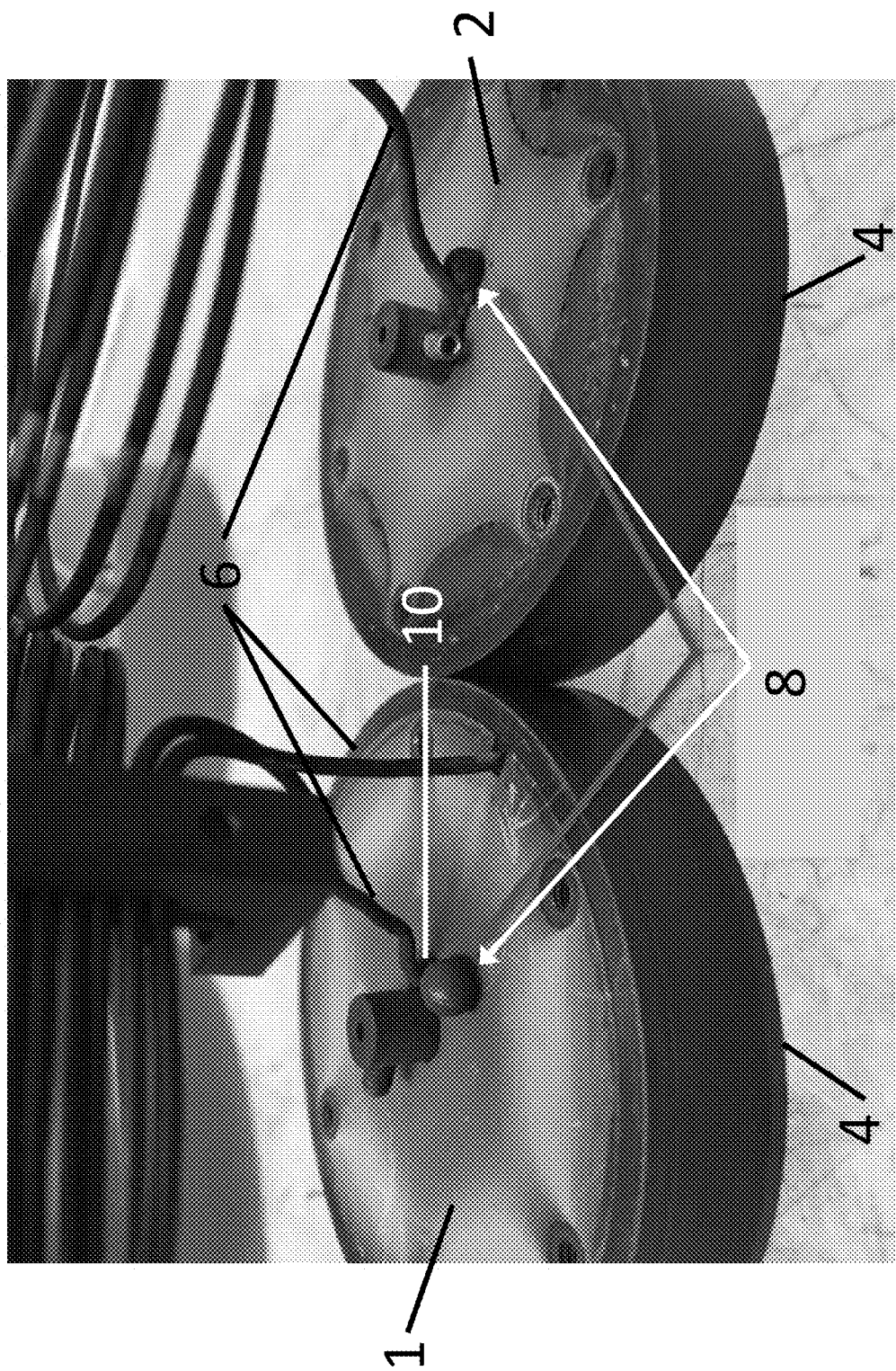
FIG. 1 is a photographic image of two substrate heating devices in the related art after operation at 840° C. for 30 minutes at an oxygen partial pressure of 200 mTorr. The droplets on the bottom of the heating devices are formed of re-melted Au/Cu braze alloy that have melted, sublimed, or evaporated from the heating element inside of the heating devices.

One or more aspects of embodiments of the present disclosure are directed toward a heating device (e.g., substrate heating device or substrate heater) that can be operated at high temperatures and low pressures (e.g., in high vacuum environments), and a method of constructing such a heating device.

Substrate heating devices capable of achieving high temperatures are commonly used in a wide variety of physical vapor deposition and thin film deposition systems. Such systems are often operated under vacuum conditions or a partial pressure gas, typically at pressures below 250 mTorr, and include a sealed chamber to house and maintain the substrate heating device and other components Substrate heating devices in the related art typically include a resistive heating element that is mechanically bonded to at least one thermally conductive metal plate. These heaters are constructed by joining the heating element to one surface of the plate via a brazing process, or alternatively by brazing the element between two thermally conductive metal plates. As used herein, the terms "braze", "brazed", and "brazing" refer to a process of joining two or more items by melting a filler metal (braze alloy) into the interface and/or gap between the two or more items, thereby mediating thermal contact between the items and forming a physically continuous part or device without melting the two items to be bonded. The brazing process for manufacturing these types of heating devices is typically accomplished in a high vacuum furnace (e.g., at high temperatures and low pressures) to eliminate the need for brazing flux, which is used under oxidizing atmospheres (such as those containing air) to prevent or reduce oxidation of the metal parts but can cause contamination and joint corrosion if not properly removed after brazing. The braze alloys used under such high vacuum conditions should typically be of high (e.g., 99.99%+) purity to prevent or reduce contamination on the surfaces of the device to be brazed and on the walls of the vacuum chamber, which adds to the cost of braze-processing (brazing). Furthermore, even trace levels of impurity or contaminants can negatively impact the strength and lifetime of a braze joint, for example, by forming brittle phases and cracks. Overall, the brazing process is expensive, complex, and prone to many possible failure modes that can result in a complete loss of the heating device.

In substrate heaters formed by braze-processing, a braze alloy filler material is melted to bond a resistive heating element to a thermally conductive metal or ceramic plate, without locally melting the heating element or the plate. During operation of the heating device, a voltage or current is applied to the resistive heating element to generate heat, which is transferred to the plate by thermal conduction. Work pieces (e.g., substrates) placed on the metal plate are then heated by thermal conduction from the plate. However, because the strength of the bond between the resistive heating element and the plate is based on the properties of the braze alloy, the effectiveness and/or range of the heating device may be limited. For example, because the heating device is formed by melting the braze alloy without melting the heating element or the plate, the braze alloy must have a relatively low melting point. As such, the maximum operating temperature of the device is based on the melting point of the braze alloy material. If the temperature of the heating device is raised to a level at or above the melting point of the braze alloy material, the braze alloy may undesirably "re-melt" and/or evaporate (e.g., become liquid and/or vapor) during operation of the substrate heater, resulting in physical and thermal separation of the heating element from the plate. The "re-melt" temperature of the braze alloy, which creates a upper limit for the usable temperature of the assembly, may be about 800° C. to about 850° C. for a high purity 50/50 gold/copper (Au/Cu) braze alloy in a vacuum or reduced pressure environment. This thereby limits the range of conditions and applications for which the heater can be used.

In addition, even when the heating device is used at a lower temperature (e.g., a temperature below the re-melt temperature of the braze alloy), the braze alloy may sublimate (e.g., undergo a phase transition from solid to vapor). The vapor phase of the braze alloy may then be dispersed throughout the chamber used for housing the substrate. This is particularly problematic when the heating device is used under high vacuum or in very low background pressure environments because sublimation of the braze alloy occurs at lower temperatures and/or faster rates as the pressure is lowered. When the heating device is used in an apparatus for depositing a thin film on a substrate (e.g., a pulsed laser deposition system, a sputtering system, a chemical vapor deposition system, etc.) under vacuum or low pressure, the sublimated braze alloy may be deposited in or on the thin film. Such contamination of the thin film by the braze alloy may negatively alter or destroy the film's physical and/or electronic properties.

Furthermore, re-melting and/or sublimation of the braze alloy may lead to non-repairable heating device failures. For example, loss of the braze alloy by melting and/or sublimation may result in formation of voids in the joint or interface between the heating element and the plate. The resulting uneven contact between the heating element and plate may cause variations in the heat sinking effect (e.g., heat transfer from the heating element to the metal plate or substrate), resulting in non-uniform heat distribution throughout the work surface, including localized hot spots that may cause physical degradation and eventual loss of function of the heating element. In addition, when the braze alloy is liquefied, the heating element may be able to flex, move, and eventually fail from mechanical stress.

FIG. 1 is a photographic image of two substrate heating devices 1 and 2 in the related art after operation at 840° C. for 30 minutes at an oxygen partial pressure of 200 mTorr. Each heating device includes a brazed heating element (not visible) attached to the inside of a thermally conductive metal case 4 using an Au/Cu braze alloy to form a mechanical bond and to provide thermal contact between the heating element and the metal case. Each metal case 4 has an external diameter of 2.5" and a height of 0.5" and is shown upside down so as to expose the bottom of each heater. The conductive wires 6 entering each metal case 4 provide the heating elements with electrical current during operation. During normal operation, the heating device would be vertically flipped (with respect to the orientation shown in FIG. 1) so as to expose a flat heater work surface (e.g., a surface that does not include any protrusions such as wires), to which a work piece or substrate can be attached. The droplets on the bottom of the heating devices are formed of re-melted Au/Cu braze alloy 8 that have melted, sublimed, or evaporated from the heating element inside of the heating devices, leaked to the outside of each heating device, for example, via the holes 10 accommodating the conductive wires 6, and subsequently re-solidified on the outside bottom of each metal case 4.

The loss of the braze alloy 8 from the inside of the heating device may result in formation of localized hot spots associated with discontinuities in the thermal contact between the heating element and the metal case of the heater, which may then cause the heating element to burn out. In addition, loss of the braze alloy 8 from the inside of the heating device may allow the heating element to move, flex, expand, etc. inside the metal case, and the mechanical stress associated with such movements increases the probability of breakage and/or shorting of the heating element. Together, these effects can cause heating devices in the related art to have significantly reduced effective lifetimes (e.g., on the order of months). As these heating devices are expensive to manufacture or purchase, and extremely difficult, if not impossible, to repair, increases in performance and lifetime are highly desirable. The contamination of films grown on the substrate by re-melted braze material, as described above, is an issue of equal importance that limits the utility of related art heating devices.

One or more embodiments of the present disclosure provide a braze-free heating device that directly addresses the above-mentioned issues. The device does not include or use any braze alloy, does not require high vacuum braze-processing, and is able to reliably achieve an operating temperature up to about 1,000° C. (e.g., is able to maintain operation over repeated heating and cooling cycles ranging from about 20° C. to about 1,000° C.). As used herein, the term "braze-free" may refer to a device or method that does not use a brazing process or a braze alloy in its formation and/or manufacture.

The cost of manufacturing the heating device of the braze-free design may be reduced by roughly 50% (due to the reduced number of processing steps and elimination of expensive braze materials) relative to substrate heaters in the related art. In addition, another benefit to this braze-free design is that the unit can be machined open to inspect for proper heat sinking, warping, or other signs of failure, then reassembled in the same fashion for further use.

According to embodiments of the present disclosure, a braze-free heating device (e.g., a substrate heating device) includes a heater block including a first heater block housing part (e.g., heater block body), a second heater block housing part (e.g., heater block lid), and a heating element compressed between the first and second heater block housing parts (e.g., the heater block body and the heater block lid), as described below. In some embodiments, the compression of the heating element between the first and second heater block housing parts results in slight deformation of the heating element between the first and second heater block housing parts along a first direction between the first and second heater block housing parts, for example, along a direction normal to the largest external surface(s) of the heating element. The heating element is thus immobilized and can maintain continuous physical and thermal contact with the first and second heater block housing parts (e.g., at the inner surfaces of the heater block housing parts) without the use of a braze alloy to join the parts or to mediate thermal contact. As used herein, the term "heater block housing" may be used to collectively refer to the first and second heater block housing parts (e.g., the heater block body and the heater block lid) used to enclose or partially enclose and compress the heating element. The term "heater block" may be used to collectively refer to the heater block housing and the heating element inside the heater block housing.

The geometry or form of the heating device is not particularly limited, and may be adapted to various work surfaces and applications according to the principles described herein. As used herein, the term "work surface" refers to the region(s) or face(s) of the heating device that are designed to be in contact with specimens, substrates, samples, etc. to be heated. The shapes of the first heater block housing part, the second heater block housing part, and the heating element may thus be selected or designed according to the desired geometry of the heating device, embodiments of which are described in detail herein.

The shapes (e.g., three-dimensional shapes) and forms of the first heater block housing part, second heater block housing part, and heating element may be selected so that the parts, when stacked or inserted, compressed, and joined, form a structure that enables the outer surfaces of the heating element to stably maintain uniform and continuous physical and thermal contact with the first and second heater block housing parts. In particular, the outer surfaces of the heating element may maintain continuous physical and thermal contact with the inner surface or face of the heater block housing opposite the outer face of the heater block housing that is to serve as the heated work surface. As a result, the structure of the heating device is: 1) physically stable (thus reducing the incidence or degree of mechanical stress caused by moving parts), and 2) allows for uniform heat transfer away from the heating element so that hot spots are not formed within the heating element (thus reducing the incidence or degree of localized thermal stress that can burn out the heating element). In some embodiments, for example, a surface of the first heater block housing part and a surface of the second heater block housing part may contact parallel opposing sides of the flat heating element, such that when the first and second heater block housing parts are symmetrically compressed toward the heating element, vector addition of the equal and opposing compression forces results in a net force (and acceleration) of substantially zero. Furthermore, in some embodiments, most or substantially all of the outer-facing surfaces of the heating element (e.g., as defined with respect to the volume of the heating element) may be in direct contact with one or more inner surfaces of the first and second heater block housing parts. For example, most or substantially all of the outer-facing surfaces of the heating element may experience the same amount or magnitude of applied compression force at the interfaces with the first and second heater block housing parts. As used herein, the term "substantially", "about", and similar terms are used as terms of approximation and not as terms of degree, and are intended to account for the inherent deviations in measured or calculated values that would be recognized by those of ordinary skill in the art. For example, the term "substantially all" as used to describe the outer-facing surfaces of the heating element, refers to embodiments in which all external surfaces of the heating element are adjacent to or in direct contact with surfaces of the first and second heater block housing parts on a macroscopic level.

The heater block housing may include at least two holes connecting its inner volume (inner cavity) and outer surface to allow the heating element inside the heater block housing to be electrically connected to a power source outside of the housing. The positioning of the holes is not particularly limited, however, it may be advantageous to select positions that are not on the work surface (e.g., upper surface) of the heating device so that the work surface is a continuous, easily cleanable surface.

In some embodiments, the braze-free heating device is a platen heating device having a planar (e.g., flat) heated work surface. As such, at least one outer surface of the first and second heater block housing parts (e.g., that corresponding to the desired work surface) is substantially planar. According to embodiments of the present disclosure, the braze-free heating device includes a heater block body (e.g., first heater block housing part), a heater block lid (e.g., second heater block housing part) on the heater block body, and a heating element between the heater block lid and the heater block body. When assembled, the heater block body may act as a lower housing for the heating element and the heater block lid may act as an upper housing for the heating element, with the top outer surface of the heater block lid being planar, and substrates to be heated being placed on or adjacent the heater block lid (e.g., the outer surface of the upper housing). The heating element is sandwiched or compressed between an interior surface of the heater block lid and an interior surface of the heater block body, as described in further detail below. The heater block lid, heating element, and heater block body are compressed so that the heating element is deformed along a first direction between the heater block lid and the heater block body, and the heating element is in continuous (uniform) physical and thermal contact with the heater block body and heater block lid. The compression and deformation allows the contact to be maintained without using or including a braze alloy. Here, the directional terms "upper", "lower", "on", "above", "horizontally", "vertically", etc., are used with respect to gravity and assume that the heating device is oriented so that the work surface stably supports the work piece against the force of gravity $F_g$, as illustrated in the relevant drawings. However, embodiments of the present disclosure are not limited thereto, and it will be understood that these relative directional terms are used only for purposes of illustration, and do not limit the orientations of the heating device and its constituent parts.

The base shape (e.g., footprint or 2D horizontal profile) of the heater block of the platen substrate heating device is determined by the base shapes of each of the heater block body, the heating element, and the heater block lid, which should match or have substantially the same shape. In some embodiments, for example when the heater block body, the heating element, and the heater block lid are each planar and are stacked vertically, the parts may have the same horizontal size, such that the lateral side-walls on the perimeter of the assembled heating device are substantially vertical. The shapes of the heater block (e.g., as determined by the heater body, the heating element, and the heater block lid) are otherwise not particularly limited. For example, the base shape of each part and of the overall heater block may be a circle (e.g., circular), an ellipse, a square, or a rectangle, but embodiments of the present disclosure are not limited thereto.

The size of the platen substrate heating device and its work surface is not particularly limited, but the sizes of the heater block body, heating element, and heater block lid should match or have complementary sizes so that the heater block body and heater block lid are able to enclose or partially enclose the heating element and can be joined together, as further described herein.

The heater block body and heater block lid are combined to form a heater block housing or case that may enclose or at least partially enclose the heating element, and may be selected from different combinations of shapes or geometries.

In some embodiments, the heater block body may have a three-dimensional shape including a bottom plate (e.g., floor) and a lateral side-wall that rises from and horizontally extends around the perimeter of the bottom plate. For example, the heater block body may have the shape of a cup or a hollow cylinder having a closed bottom and an open top. Meanwhile, the heater block lid may have a shape including an upper plate (e.g., ceiling) without a side-wall. For example, the heater block lid may have the shape of a flat disk. The heating element may be inserted into the heater block body so that it sits on the lower inner surface of the heater block body. The heater block lid may then be placed on the upper surface of the heating element and attached to the heater block body at or near an upper edge of its lateral side-wall (e.g., at or near the rim of the cup-shaped heater block body), thereby enclosing the heating element within the heater block housing. The heater block lid may then be vertically compressed toward the heater block body to deform the heating element therebetween along the direction of compression. The heater block lid and heater block body maintain the compression (compressive force) on the heating element after the heating device is assembled.

Figure 2:
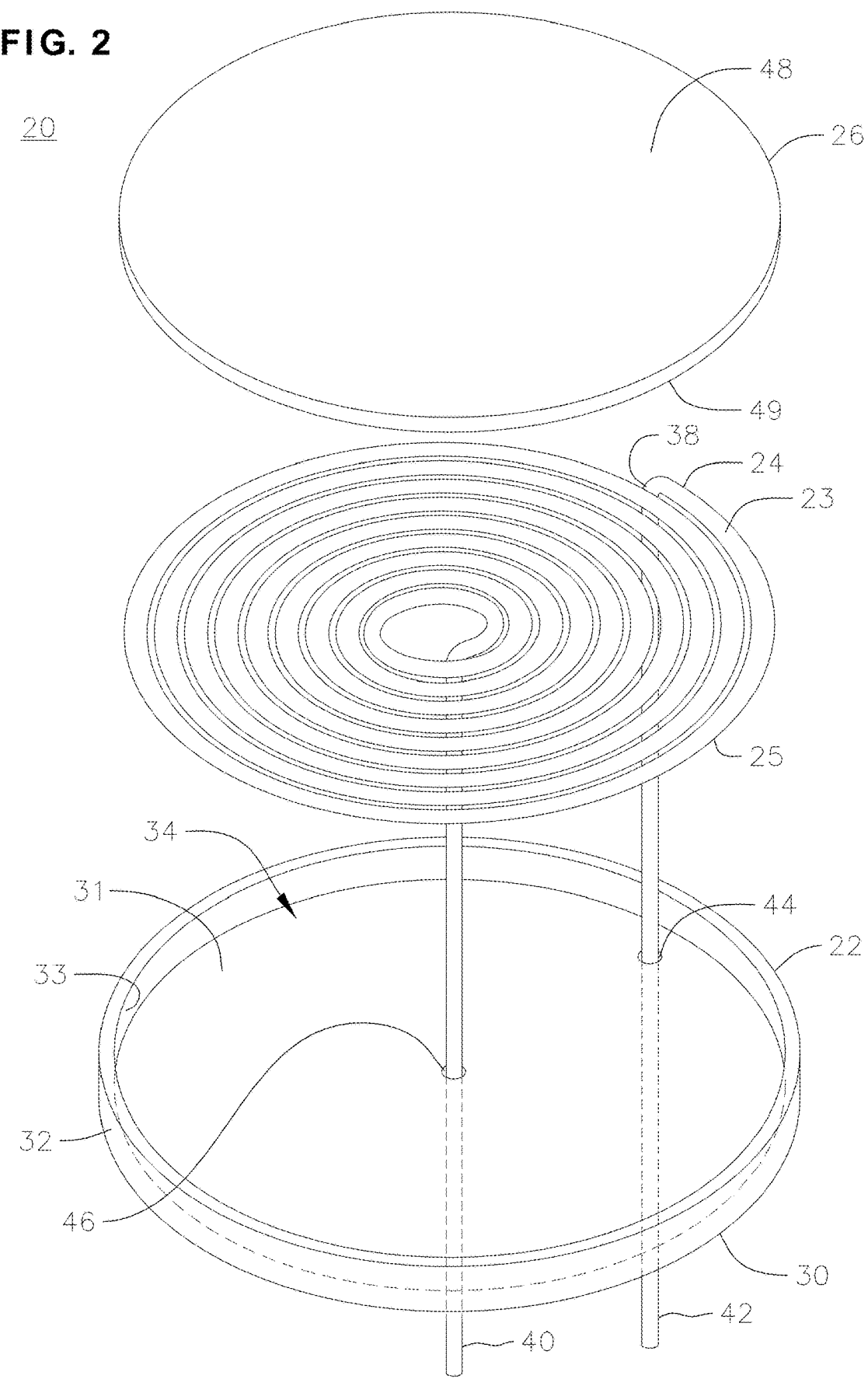
FIG. 2 is a schematic diagram showing an exploded view of an example heater block including a heater block body having the shape of a cup, a heating element having the shape of a disk, and a heater block lid having the shape of a plate, according to embodiments of the present disclosure.

FIG. 2 is a schematic diagram showing an exploded view of an example heater block 20 formed from the above combination of heater block housing parts, including a heater block body 22 having the shape of a cup, a heating element 24 having the shape of a disk with an upper surface 23 and an opposite lower surface 25, and a heater block lid 26 having the shape of a plate. The heater block body 22 includes a circularly shaped bottom plate 30 with a side-wall 32 extending up from the bottom plate 30, which together define an internal cavity 34 bounded by the inner lower surface 31 and the inner side-wall surface 33. The heating element 24 is formed from a heating wire 38 that includes leads 40 and 42 that pass through holes 44 and 46 in the bottom plate 30 to connect the heating element 24 to a power source during operation. The heating element 24 is positioned within the internal cavity 34 so that it rests on the inner lower surface 31 of the bottom plate 30, and is sized so that it fits snugly (e.g., without room for lateral movement) within the internal cavity 34. The heater block lid 26 has a flat upper work surface 48 and an opposite inner surface 49, and is positioned on or above the heating element 24. The heater block lid 26 is sized so that the heater block lid 26 can be joined to the heater block body 22 at or near the side-wall 32 while allowing the heating element 24 to be compressed between the heater block lid 26 and the bottom plate 30. For example, the diameter of the heater block lid 26 should be similar to or less than the diameter of the internal cavity 34 (e.g., the inner diameter of the heater block body 22) to allow the heater block lid 26 to be pushed down toward the heating element 24.

Although the embodiment of FIG. 2 depicts a heater block having a circular base shape (e.g., a cylindrical volume), it will be understood that this shape is merely illustrative and that the heating device may have alternate shapes, such as a square shape, rectangular shape, etc. Furthermore, the positioning of the holes 44 and 46 is merely illustrative, and it will be understood that such holes may be positioned in other parts of the housing to accommodate other heating wire winding geometries, including other regions of the bottom plate 30 or the side-wall 32.

In some embodiments, the heater block body may have the shape of a plate and the heater block lid may have a three-dimensional shape including an upper surface (e.g., ceiling) and a lateral side-wall that extends below and horizontally extends around the perimeter of the upper surface. For example, the heater block lid may have the shape of an inverted cup and the heater block body may have the shape of a plate (e.g., the shapes of the heater block body and heater block lid are switched relative to the previously described embodiment). The heating element may be placed on the upper inner surface of the heater block body. The heater block lid may then be placed over the heating element so that the heating element is covered by the heater block lid, and the lower inner surface (e.g., the ceiling) of the heater block lid is in contact with the upper surface of the heating element. The heater block lid is then attached to the perimeter of the heater block body at or near the lower edge of its lateral side-wall (e.g., at or near the rim of the inverted cup-shaped heater block lid), thereby enclosing the heating element within the heater block housing. The heater block lid may then be vertically compressed toward the heater block body to deform the heating element therebetween along the direction of compression. The heater block lid and heater block body maintain the compression (compressive force) on the heating element after the heating device is assembled.

Figure 3:
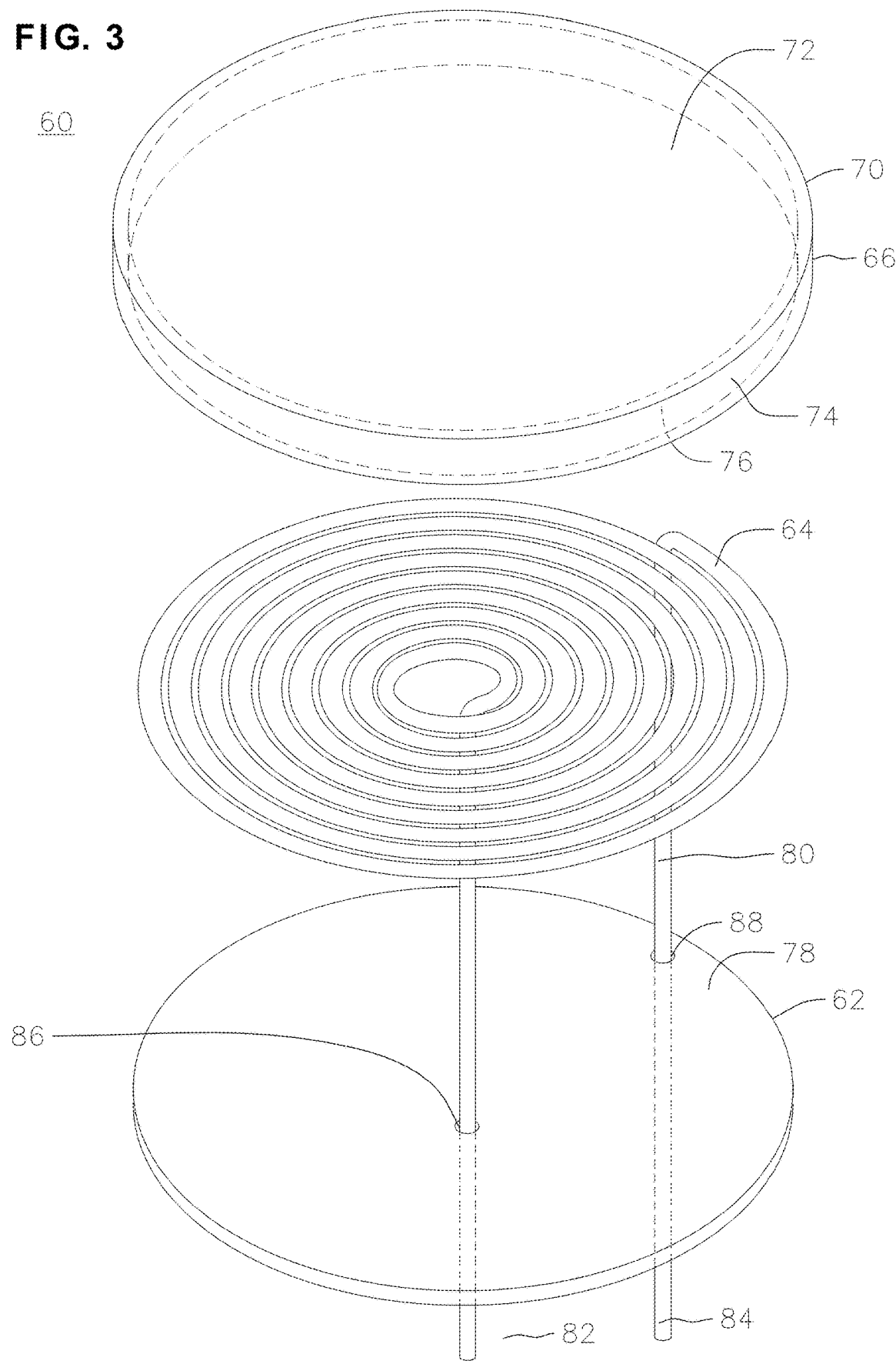
FIG. 3 is a schematic diagram showing an exploded view of example heater block including a heater block body having the shape of a plate, a heating element having the shape of a disk, and a heater block lid having the shape of an inverted cup, according to embodiments of the present disclosure.

FIG. 3 is a schematic diagram showing an exploded view of example heater block 60 formed from the above combination of heater block housing parts, including a heater block body 62 having the shape of a plate, a heating element 64 having the shape of a disk, and a heater block lid 66 having the shape of an inverted cup. The heater block lid 66 is generally cylindrically shaped and includes a circular upper plate 70 with a flat upper work surface 72 and a side-wall 74 extending down from the upper plate 70, which together define an internal cavity 76. The heating element 64 is formed from a heating wire 80 that includes leads 82 and 84 that pass through holes 86 and 88 in the heater block body 62 to connect the heating element 64 to a power source during operation. The heating element 64 is positioned on the upper (inside) surface 78 of the heater block body 62 and is sized so that it fits snugly (e.g., without room for lateral movement) within the internal cavity 76. The heater block lid 66 is then positioned on or above the heating element 64 on the heater block body 62 to enclose the heating element 64. The heater block lid 66 is sized so that the heater block lid 66 can be joined to the heater block body 62 at or near the side-wall 74 while allowing the heating element 64 to be compressed between the heater block lid 66 and the heater block body 62. For example, the diameter of the heater block body 62 should be equal to or less than the diameter of the internal cavity 76 (e.g., the inner diameter of the heater block lid 66) to allow the heater block body 62 to be pushed up toward the heating element 64.

Although the embodiment of FIG. 3 depicts a heater block having a circular base shape (e.g., a cylindrical volume), it will be understood that this shape is merely illustrative and that the heating device may have alternate shapes, such as a square shape, rectangular shape, etc. Furthermore, the positioning of the holes 86 and 88 is merely illustrative, and it will be understood that such holes may be positioned in other parts of the housing, including other regions of the heater block body 62 or in the side-wall 74 of the heater block lid 66.

In some embodiments, the heater block body and the heater block lid may both have the shape of a plate. The heating element may be placed between the heater block body and the heater block lid, and may be compressed therebetween. The heater block body and the heater block lid may be joined at their perimeter edges (e.g., by welding, clamping, etc.) to thereby enclose the heating element between the two housing parts. The heater block lid may then be vertically compressed toward the heater block body to deform the heating element therebetween along the direction of compression. In some embodiments, both the heater block body and the heater block lid are substantially flat. In some embodiments, the heater block body and the heater block lid may each include a shallow lateral wall horizontally extending around the perimeter of each part as well as vertically toward the wall of the other housing part. The walls may be matched and joined together as described above.

Figure 4:
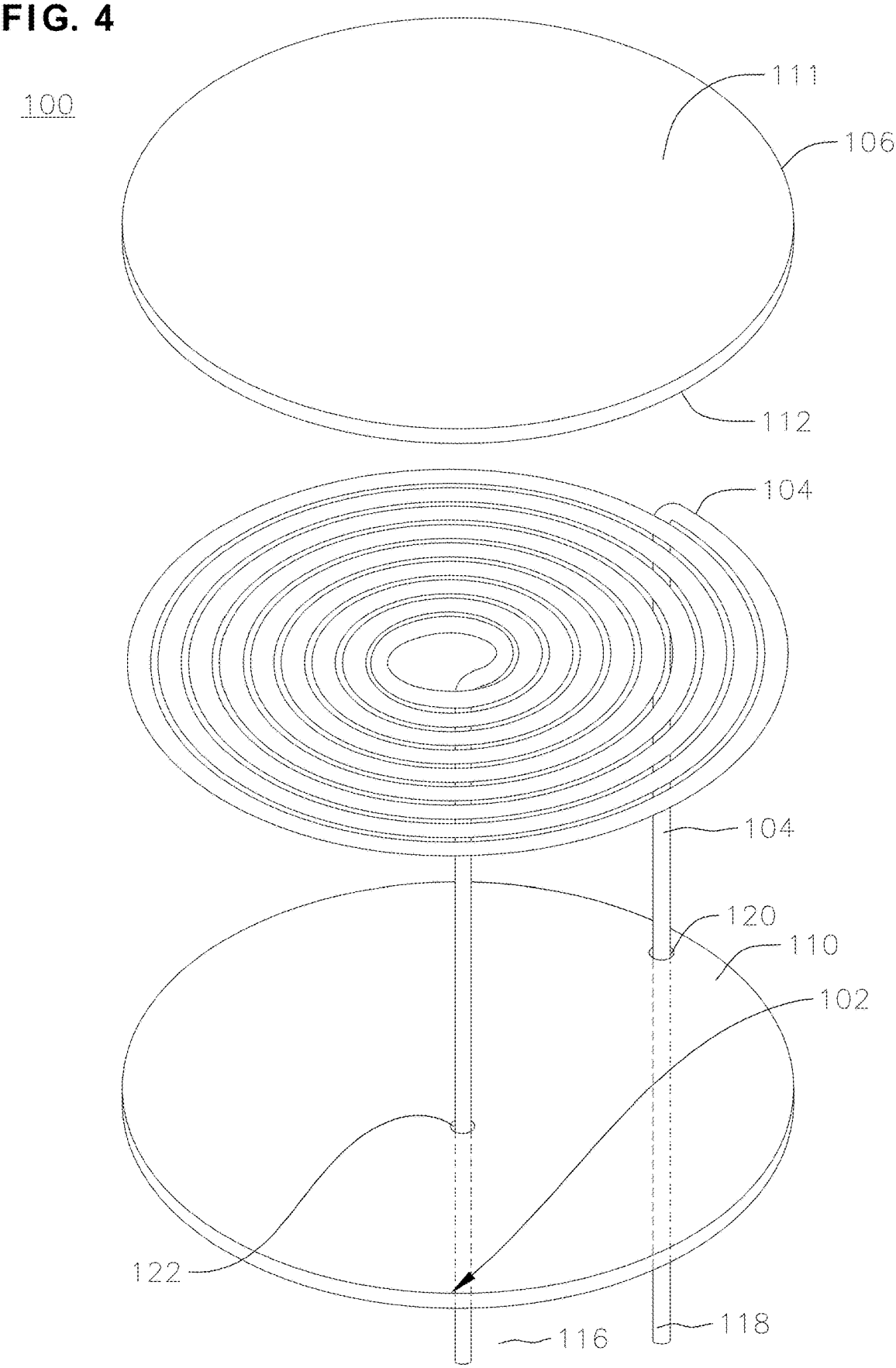
FIG. 4 is a schematic diagram showing an exploded view of example heater block including a heater block body having the shape of a plate, a heating element having the shape of a disk, and a heater block lid having the shape of a plate, according to embodiments of the present disclosure.

FIG. 4 is a schematic diagram showing an exploded view of example heater block 100 including a heater block body 102 having the shape of a plate, a heating element 104 having the shape of a disk, and a heater block lid 106 having the shape of a plate. The heating wire 114 forming the heating element 104 includes leads 116 and 118 that pass through holes 120 and 122 in the heater block body 102 to connect the heating element 104 with a power source during operation. The heating element 104 is positioned on the upper (inside) surface 110 of the heater block body 102. The heater block lid 106 having an upper work surface 111 is positioned on or above the heating element 104 so that its opposing lower (inner) surface 112 is in direct contact with the heating element 104. The heater block body 102 and heater block lid 106 may each have a diameter that is equal to or larger than the diameter of the heating element 104 so that the vertical-facing surfaces of the heating element 104 are covered and the heater block body 102 and heater block lid 106 can be clamped or joined at their perimeter to thereby compress the heating element 104 without interference from the heating element 104. The compressed stack may be joined by welding the heater block body 102 and heater block lid 106 together at their facing perimeters.

Although the embodiment of FIG. 4 depicts a heater block having a circular base shape (e.g., a cylindrical volume), it will be understood that this shape is merely illustrative and that the heating device may have alternate shapes, such as a square shape, rectangular shape, etc. Furthermore, the positioning of the holes 120 and 122 is merely illustrative, and it will be understood that such holes may be positioned in other parts of the housing, including other regions of the heater block body 102.

In each of the embodiments in which the heater block body and/or the heater block lid includes a lateral side-wall, the height of the lateral side-wall or the combined height of the lateral side-walls is selected so that it is still possible to compress (e.g., vertically compress) the heating element between the two housing parts without interference from the lateral side-wall, as described in detail herein.

In some embodiments, the braze-free heating device may be formed to have a non-planar working (heating) surface or surfaces. In some embodiments, for example, the braze-free heating device may have a curved work surface, such as the outer diameter of a cylindrically shaped wheel or spool, the inner diameter of a hollow cylinder, or a partial section of a cylindrical shape. Such a work surface may be of particular utility in preparation of curved substrates, or for example in processing of long, flat substrate ribbons or tapes that may be simultaneously driven (passed over the surface) and heated, or in heating around the outside of a substrate or item (for example, as a sheath around a bomb reactor or pipe).

In some embodiments, the heating element used in the braze-free heating device having a curved work surface may be formed by winding, coiling, or bending a resistive heating wire to fill a planar shape, and subsequently bending or warping the planar heating element to form a curved heating element shape. In this case, the first and second heater block housing parts (e.g., heater block body and heater block lid) may also be curved or formed to be curved so that a surface of the first heater block housing part is able to make conformal, uniform contact with one surface of the curved heating element, and a surface of the second heater block housing part is able to make conformal, uniform contact with the opposing surface of the curved heating element, and the first and second heater block housing parts can be joined together at their perimeters to compress and hold the heating element. For example, the first and second heater block housing parts stacked with the heating element therebetween may form a structure reminiscent of a stack of semi-cylindrical clay roof tiles or a stack of hyperbolic paraboloidal potato-based crisps. The heater block lid may then be vertically compressed toward the heater block body to deform the heating element therebetween along the direction of compression.

In some embodiments, the heating element used in the braze-free heating device having a curved work surface may be formed by spirally winding or wrapping a resistive heating wire around a central spool to form an open cylinder or ring. In this case, the first heater block housing part may generally have the shape of a solid or open cylinder or ring, and may be positioned in the middle of the wound heating element (e.g., as an inner heater block body) to support the inside diameter of the cylindrical or ring-shaped heating element. The second heater block housing part may be placed around the outside diameter of the wound heating element (e.g., as an outer heater block lid) and joined to the inner heater block body. The wound heating element may thus be compressed between the inner heater block body and the outer heater block lid to deform the heating element therebetween along the direction of compression (e.g., in a radial direction).

Figure 5:
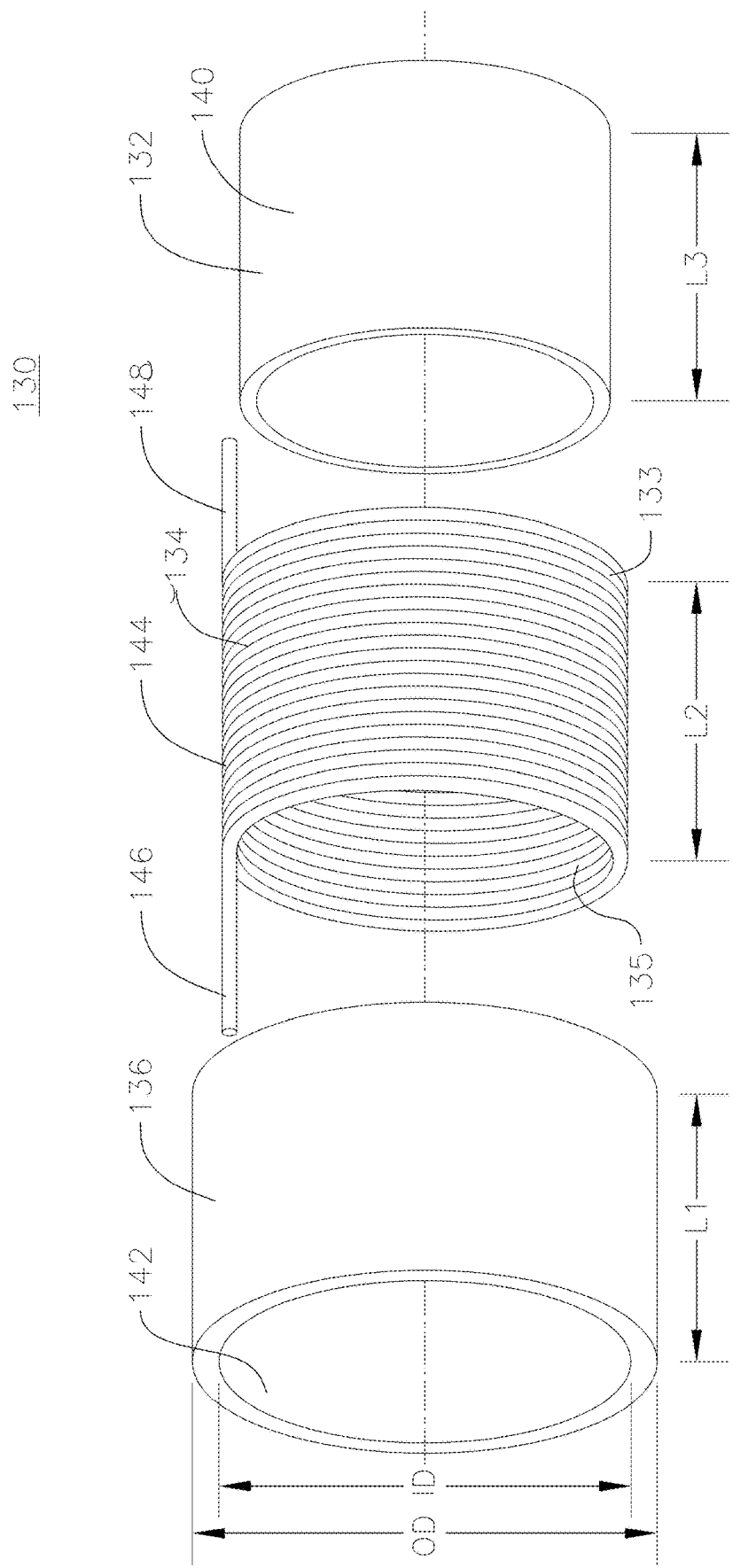
FIG. 5 is a schematic diagram showing an exploded view of example heater block including a heater block body (inner housing), a wound heating element, and a heater block lid (outer housing), each having the shape of an open cylinder according to embodiments of the present disclosure.

FIG. 5 is a schematic diagram showing an exploded view of example heater block 130 according to the above configuration of heater block housing parts, including an inner heater block body 132, a heating element 134 having an inner surface 133 and an outer surface 135, and an outer heater block body 136, each having the shape of an open cylinder. The heating wire 144 forming the heating element 134 includes leads 146 and 148 that connect the heating element 134 with a power source during operation. The heating element 134 is positioned around the cylindrical inner heater block body 132 so that its inner surface 133 is in direct contact with the outer surface 140 of the cylindrical inner heater block body. The outer heater block body 136 is positioned around the heating element 134 so that its inner surface 142 is in direct contact with outer surface 135 of the heating element 134. The inner heater block body 132 has an outer diameter that is about equal to the inner diameter of the heating element 134 and the outer heater block body 136 has an inner diameter that is about equal to the outer diameter of the heating element 134 so that the inner surface 133 and an outer surface 135 of the heating element 134 are in direct and continuous contact with the inner and outer housing parts. In some embodiments, the concave outer diameter of the cylindrical heating device may be used as the work surface. In some embodiments, the convex inner diameter of the cylindrical heating device may be used as the work surface (e.g., the heating device may be used as a heating sheath). The lengths (e.g., cylinder height) of the inner heater block body 132 and the outer heater block body 136 (e.g., l1 and l3, respectively) may be equal to or longer than that of the heating element 134 (e.g., l2) to allow the inner and outer housing parts to be clamped and joined at their edges without interference from the heating element 134.

In some embodiments, the braze-free heating device may have a heater block having the shape of a cup, cylinder, or truncated hollow cone, with the heated work surface corresponding to the inside surface of said cup, cylinder, or truncated hollow cone. Such a work surface may be of particular utility as part of a self-heating cup or crucible, or as a heated mantle or sleeve for a ceramic or metal crucible, as might be used to contain a deposition material or reaction mixture. In this case, the heating element may be formed by spirally winding a resistive heating wire in a plane to form a bottom plate or surface (e.g., cup floor), and then winding the resistive heating wire above the outer perimeter of the bottom plate to form a side-wall rising from the bottom plate. The heater block body and the heater block lid may be formed to have the same general cup shape as the heating element, each having a bottom plate and a side-wall rising from the bottom plate. The heater block body may be positioned under and outside of the heating element to support the outside surface of the heating element. The heater block lid may be positioned on and above the heating element to support the inside surface of the heating element. The upper/inside surface of the heater block body is able to make conformal, uniform contact with the lower and outside surfaces of the heating element, and the lower/outer surface of the heater block lid is able to make conformal, uniform contact with the opposing upper and inner surfaces of the heating element, such that the three parts are nested when stacked.

In some embodiments, the side-walls of each of the heater block body, heating element, and heater block lid may form an angle of about 90 degrees with each bottom plate (e.g., so that the inner diameter and outer diameter of each of the heater block body, heating element, and heater block lid remain constant over the entire vertical height of each part. In this case, the inner and outer diameters of each of the heater block body, heating element, and heater block lid should allow the three parts to be stacked as described above. For example, the inner diameter of the heater block body should be substantially equal to or less than the outer diameter of the heating element, and the inner diameter of the heating element should be substantially equal to or less than the outer diameter of the heater block lid.

In some embodiments, the side-walls of each of the heater block body, heating element, and heater block lid may form an angle of larger than about 90 degrees with each bottom plate (e.g., so that the cup flares outward, has an inner diameter that increases with increasing vertical height within the cup, or has an upper opening that is larger than the base of the cup). Again, the inner and outer diameters of each of the heater block body, heating element, and heater block lid should allow the three parts to be stacked as described above. For example, the inner diameter of the heater block body should be substantially equal to or less than the outer diameter of the heating element, and the inner diameter of the heating element should be substantially equal to or less than the outer diameter of the heater block lid at any given height within the cups. The heater block lid may be compressed toward the heater block body to deform the heating element therebetween, for example, in a vertical direction (normal to the stacked bottom plates), as well as along or normal to the side-walls when the side-walls flare outward. Furthermore, the heights of the heater block body (h3), heating element (h2), and heater block lid (h1) may be selected so that the heater block body and heater block lid can be joined together at their upper rims without interference from the heating element.

Figure 6:
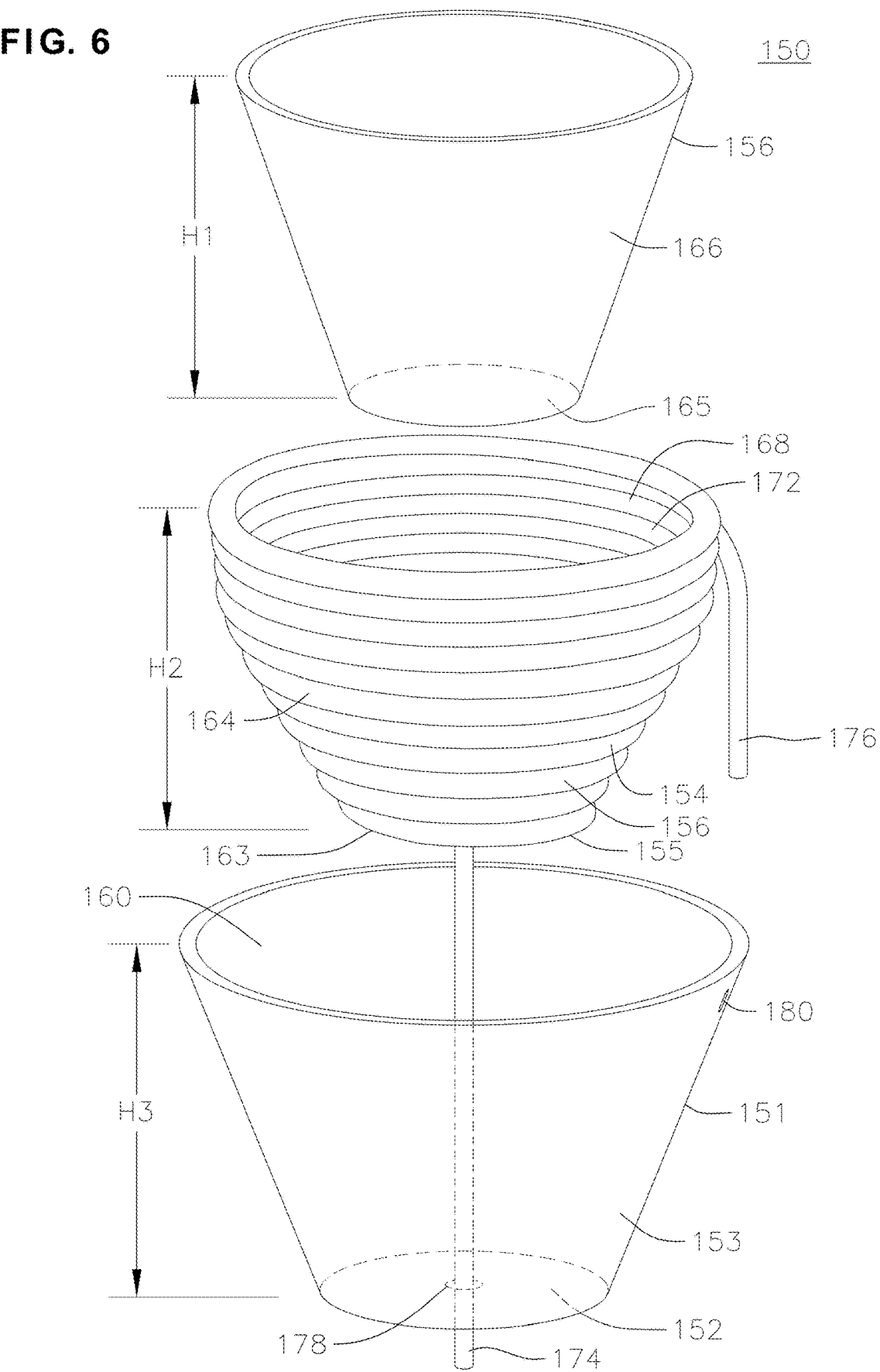
FIG. 6 is a schematic diagram showing an exploded view of an example heater block including an heater block body (outer/lower housing), a wound heating element, and an heater block lid (inner/upper housing), each generally having the shape of an cup having outwardly flared side-walls and an upper opening larger in area than the lower base according to embodiments of the present disclosure.

FIG. 6 is a schematic diagram showing an exploded view of an example heater block 150 including an heater block body 151 with bottom plate 152 and side-wall 153, a wound heating element 154 with bottom plate 155 and side-wall 156, and an heater block lid 157 with bottom plate 158 and side-wall 159, each generally having the shape of an cup having outwardly flared side-walls and an upper opening larger in area than the lower base. The heating element 154 is positioned within the internal cavity 160 of the heater block body 151 so that the inner floor and inner side-wall surfaces 161 of the heater block body 151 contact the outer surfaces 163 and 164 of the heating element 154. The heater block lid 157 is positioned within the internal cavity 165 of the heating element 154 so that the outer floor surface 165 and side-wall surfaces 166 of the heater block lid 157 contact the inner floor and inner side-wall surfaces 168 of the heating element 154. The wires 172 forming the heating element 154 include leads 174 and 176 that pass through holes 178 and 180 in heater block body 151 to connect the heating element 154 with a power source during operation. The heights of the heater block lid 157 and the outer heater block body 151 may be equal to or larger than that of the heating element 154 to allow the heater block body and heater block lid to be clamped or joined at their perimeter to thereby compress the heating element 154 without interference from the heating element 154.

The heating element generates heat (e.g., is the source of heat energy) in the heating device. In some embodiments, the heating element may be a resistive heating element formed of a heating wire, where the heating wire is wound, coiled, and/or bent to fill in a desired shape.

In some embodiments, for example when the substrate heating device is a platen heating device, the heating wire may be coiled, wound, or bent to fill a substantially planar shape (e.g., formed or coiled in a plane). For example, as depicted in FIG. 2, the heating wire may be spirally wound in a plane to form a circular (e.g., disk-shaped) heating element 24, having an upper surface 23 and an opposite lower surface 25. As described below, when assembled, the upper surface 23 of the heating element 24 is placed in contact with the inner surface 49 of the heater block lid 26, and the lower surface 25 is placed in contact with the inner lower surface 31 of the heater block body 22 as well as the inner side-wall surface 33 of the heater block body 22. However, the shape of the heating element is not limited to being circular, and the heating wire may be wound in any suitable or desired planar shape as long as the bending radius of the heating wire does not preclude or prevent formation of that shape.

In some embodiments, for example when the substrate heating device has a cylindrical work surface, the heating wire may be wound or coiled to form the curved outside edge of a ring or cylinder. For example, as depicted in FIG. 5, the heating wire 144 may be spirally wound around a spool-shaped inner heater block body 132 to form a heating element 134, having an inner surface 133 and an opposing outer surface 135. As described below, when assembled, the inner surface 133 of the heating element 134 is placed in contact with the outer convex surface 140 of the inner heater block body 132, and the outer surface 135 is placed in contact with the inner concave surface 142 of the outer heater block body 136. The heating wire may be wound to any suitable or desired cylindrical diameter or length as long as the bending radius of the heating wire does not preclude or prevent formation of that shape.

In some embodiments, the heating wire forming the heating element may be welded together at one or more points to maintain its shape and to reduce mechanical stress associated with movement or flexing of the heating element. The welding may be accomplished using any welding technique that avoids deformation, melting, and/or shorting of the heating wire, for example, laser spot welding.

Figure 7:
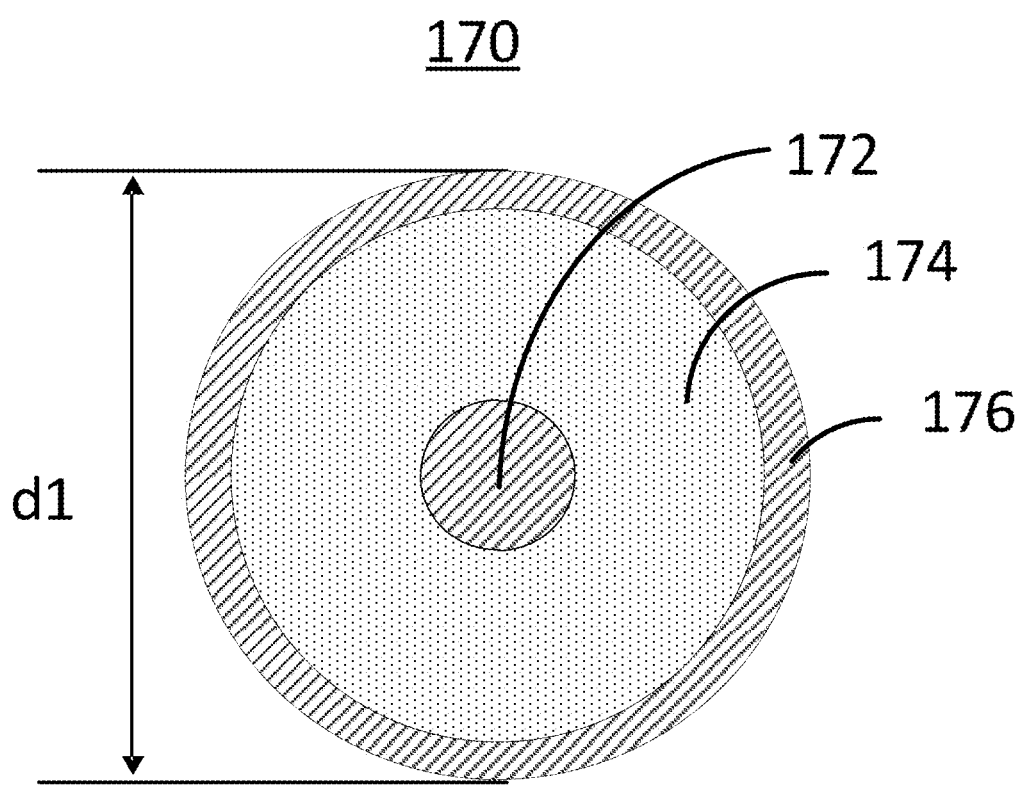
FIG. 7 is a schematic diagram showing the cross-sectional structure of a heating wire used to form the heating element. The heating wire includes an inner resistive wire surrounded by a tightly packed electrically insulating powder and wrapped in an outer protective sheath. The inner resistive wire is centered relative to the outer protective sheath.

FIG. 7 is a schematic diagram showing the cross-sectional structure of a heating wire used to form the heating element according to embodiments of the present disclosure. The heating wire 170 may be described in terms of its outer diameter d1, and includes an inner resistive wire 172 surrounded by a tightly packed electrically insulating powder 174, the combination being wrapped in an outer protective sheath 176. The inner resistive wire 172 is centered relative to the outer protective sheath 176. For example, the inner resistive wire 172 and the outer protective sheath 176 are concentric, co-axial, and separated by the insulating powder 174. The inner resistive wire may be any material that can durably convert electrical current to heat. Non-limiting examples of such material may include a metal or alloy such as FeCrAl alloy and/or NiCr alloy.

The diameter (e.g., outer diameter, OD) of the heating wire used to form the heating element is not particularly limited. In some embodiments, the OD of the heating wire may be about 1 mm to about 5 mm, for example, about 1.5 mm, about 2 mm, about 2.5 mm, about 3 mm, or any diameter therebetween.

The electrically insulating powder prevents the current carrying heating wire 170 from contacting and transferring current to (e.g., forming an electrical short with) the outer protective sheath 176. The electrically insulating powder is physically and chemically stable (e.g., non-melting and non-reactive) at the high temperatures generated by the heating wire 170, and allows heat to be efficiently transferred from the heating wire to the outer protective sheath and beyond. For example, the insulating powder may include a suitable non-conductive metal oxide, metal carbide, or metal nitride compound. Non-limiting examples of such compounds may include $MgO$, $Al_2O_3$, $TiO_2$, $ZrO_2$, $SiO_2$, $SiN_2$, and mixtures thereof.

The material properties of the inner resistive wire, electrically insulating powder, and outer protective sheath, including melting point, resistance to oxidation, and maximum heating temperature may be selected to raise or maximize the upper temperature limit (e.g. to avoid limiting the operating temperature) of the heating device. Those having ordinary skill in the art are capable of selecting suitable wires according to the known properties of the materials used therein and the desired operating range of the heating device.

In some embodiments, the heater block body, the heater block lid, and the outer protective sheath of the heating element may each be made of the same material. For example, the heater block body, the heater block lid, and the outer protective sheath of the heating element are each made of a high temperature metal or alloy. The high temperature metal or alloy may be selected from molybdenum (Mo), chromium (Cr), nickel (Ni), tungsten (W), tantalum (Ta), titanium (Ti), cobalt (Co), iron (Fe), niobium (Nb), and mixtures thereof. In some embodiments, the high temperature metal alloy may be an alloy including Ni, Co, Cr, Fe, and trace amounts (e.g., about 1.00% or less) of carbon (C), manganese (Mn), sulfur (S), silicon (Si), and copper (Cu) (e.g., Inconel® 600), an alloy including Ni, Cr, Fe, Mo, Nb, and Ta, and trace amounts (e.g., about 0.50% or less) of C, Mn, Si, phosphorus (P), S, aluminum (Al), Ti, and Co (e.g., Inconel® 625), or stainless steel. The material may be selected according to the maximum temperature of the metal and the materials used in commercially available heating wire. In some embodiments, the heater block body, the heater block lid, and the outer protective sheath of the heating element may be made of Inconel® 600 or 625.

The first and second heater block housing parts (e.g., the heater block body and heater block lid) and the outer protective sheath of the heating element are each made of materials having a substantially identical or the same coefficient of thermal expansion (CTE), thereby ensuring that the heating element is not subjected to excess mechanical stress during heating and cooling cycles, for example, by one part having a higher CTE than the others and therefore expanding more and exerting pressure on the other parts. The term "coefficient of thermal expansion" is used herein in its art-recognized sense to refer to the degree of (volumetric) expansion exhibited by a material having a given composition with respect to a change in the temperature of the material.

In some embodiments, each of the heating device parts may have a CTE of less than about $2.0 \times 10^{-5}$ °C.$^{-1}$, for example, about $2.0 \times 10^{-6}$ °C.$^{-1}$ to about $1.8 \times 10^{-5}$ °C.$^{-1}$, about $4.5 \times 10^{-6}$ °C.$^{-1}$ to about $1.8 \times 10^{-5}$ °C.$^{-1}$, or about $9.0 \times 10^{-6}$ °C.$^{-1}$ to about $1.8 \times 10^{-5}$ °C.$^{-1}$. However, embodiments of the present disclosure are not limited thereto, and those having ordinary skill in the art are capable of selecting materials with suitable CTEs according to the principles described herein. In general, materials having higher CTEs are compatible with lower ranges of compressive force (e.g., on the heating element between the heater block housing parts), and materials having lower CTEs are compatible with lower ranges of compressive force, as described herein in connection with the assembly of the heating device.

In some embodiments, the difference or variation in CTE between the parts of the heating device may be substantially zero (e.g., when the parts are made of the same material having the same composition). That is, the CTEs of the parts may be substantially identical or equal. In some embodiments, the maximum difference or variation in CTE between the parts of the heating device may be about 0% to about 10%, for example, about 0.1% to about 8%, 0.1% to about 5%, 0.1% to about 3%, or 0.1% to about 2%, as calculated with respect to the lowest CTE. However, embodiments of the present disclosure are not limited thereto, and those having ordinary skill in the art are capable of determining the maximum suitable or desirable different in CTE between heating device parts according to the principles described herein and the tolerances of the heating device.

The first and second heater block housing parts (e.g., the heater block body and heater block lid) may be formed using any suitable method compatible with the materials to be used. For example, the metal or alloy parts may be machined, milled, cast, or extruded.

In some embodiments, the inner surfaces of the first and second heater block housing parts (e.g., the surfaces that are in contact with the heating element, including internal floors, ceilings, and walls) may be further designed, formed, or processed to conformally surround the heating element. For example, when the heating device is a platen-type heater having a circular platform (cylindrical form) and the heating element is formed by coiling a resistive heating wire to form a disk, the heating element may generally have the shape of a disk, but cannot be formed into a disk with a constant diameter because the diameter of the heating element continuously increases as the wire traverses the outer perimeter of the coil. The increase in the diameter of the heating element is analogous to the increase in the size of a cone shell as the snail forms new compartments. As such, in some embodiments, the interior of the first and second heater block housing parts may be formed to have circular or elliptical base shapes to accommodate the widest diameter of the coiled heating element, but portions of the lateral surface of the coil along a smaller diameter (e.g., between about 180 degrees and 0 degrees in front of the coiled wire) may not be in contact with the inner surfaces of the heater block housing (e.g., may be adjacent to a void within the heater block housing), and may thus experience a lower degree of mechanical support against flexing and bending. Indeed, that portion of the heating element that is not in contact with a surface of the heater block housing may flex and expand within the void under high heat loads, which movement may eventually cause the heating element to warp and rip apart (e.g., along the outer sheath of the heating wire) and fail. Therefore, in some embodiments, the inner surfaces of the first and/or second heater block housing parts may include protrusions, spacers, channels, bores, and/or other features to provide the heating element with uniform support (e.g., a heating element-housing interface) in all directions. For example, the inner surfaces of the first and/or second heater block housing parts may include a bore having an increasing radius in a shape that complements that of the heating element. From another perspective, the heater block body or the heater block lid may include an inner spacer to fill the lateral space around the lateral perimeter of the heating element.

Figure 8A:
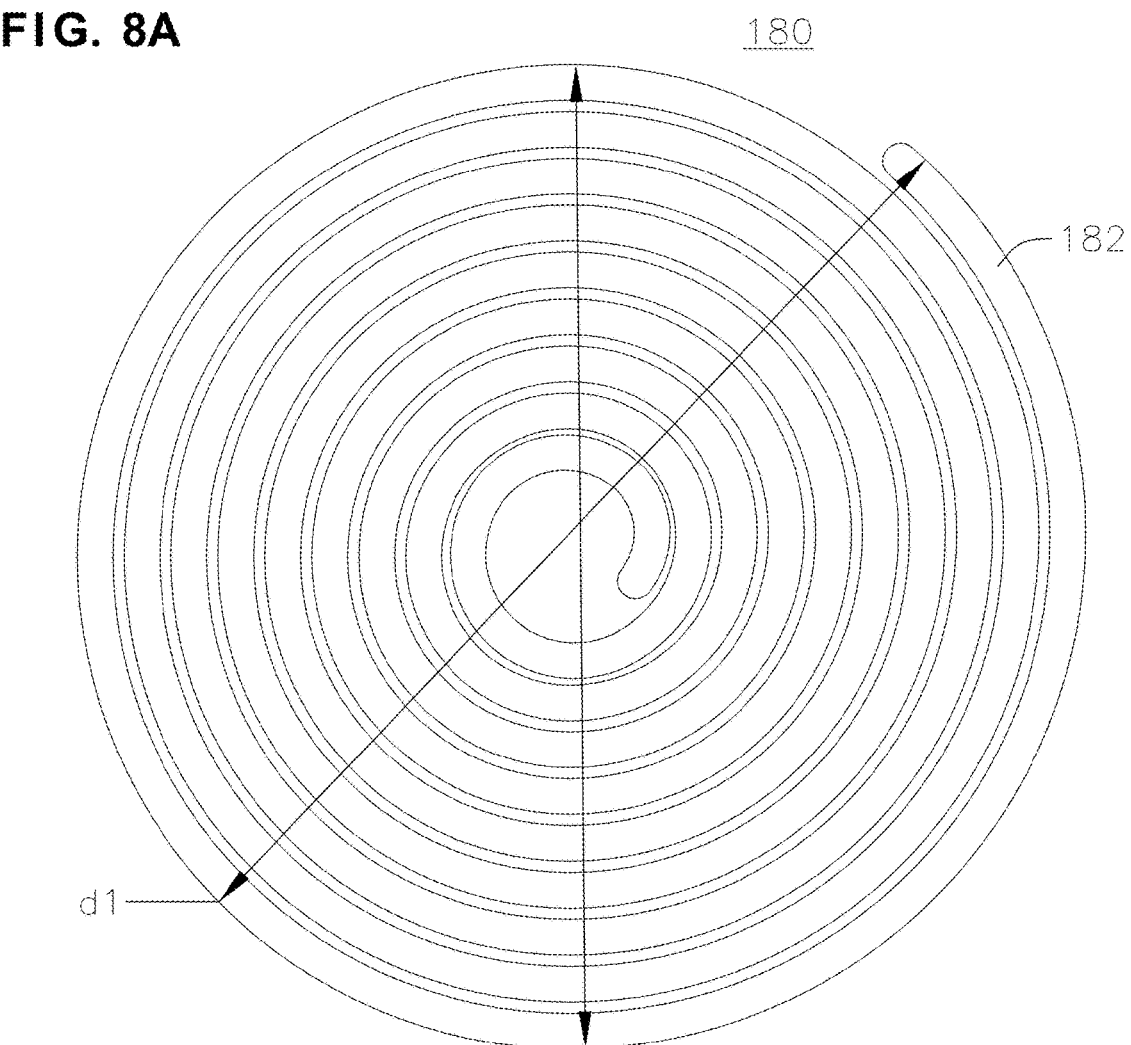
FIGS. 8A and 8B are schematic images showing top-down and perspective views of a heating element formed from a radially or spirally coiled wire, according to embodiments of the present disclosure.
Figure 8B:
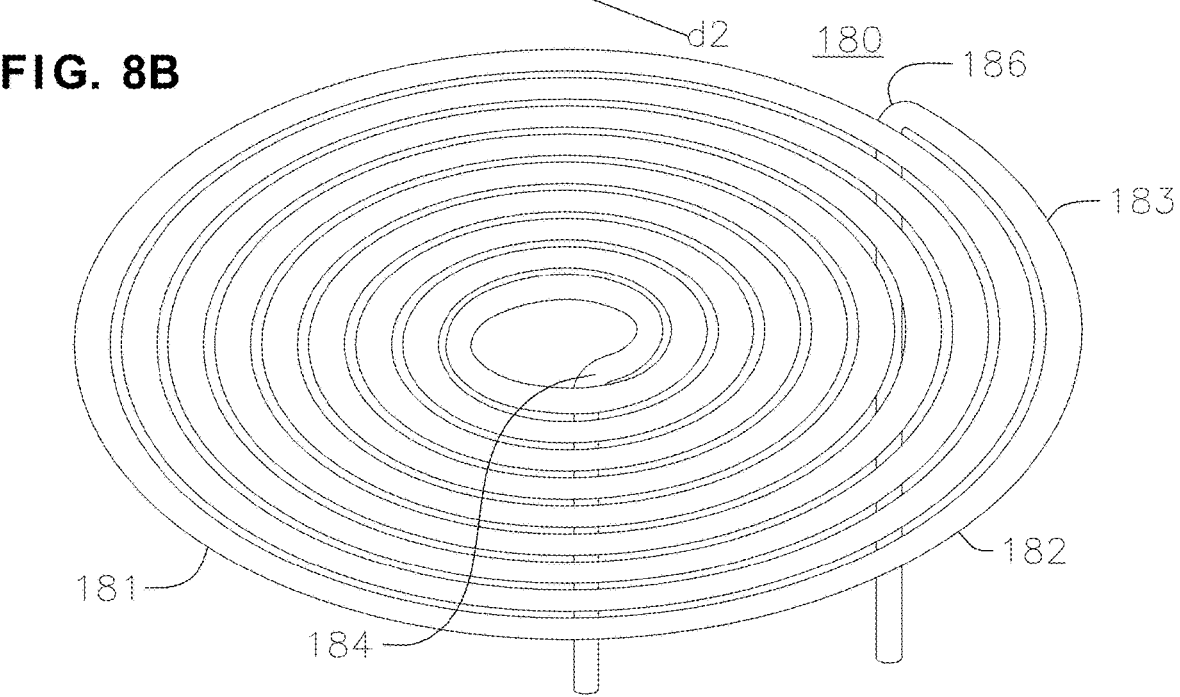

FIGS. 8A and 8B are schematic images showing top-down and perspective views of a heating element 180 formed from a radially or spirally coiled wire 182 having a lower surface 181, a perimeter surface 183, and an upper surface 185 opposite the lower surface 181. A first end lead 184 of the wire 182 is bent perpendicularly from the plane of the coiled wire at the center of the coil. The second end lead 186 of the wire 182 is bent perpendicularly from the plane of the coiled wire at an outer perimeter of the coil. The diameter of the coiled wire 182 is larger at d1 than, for example, at d2.

Figure 8C:
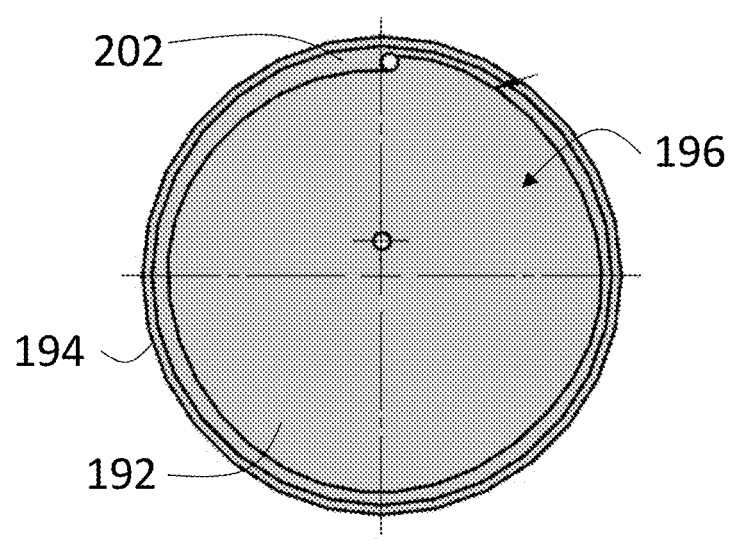
FIGS. 8C and 8D are schematic images showing top-down and perspective views of a heater block body that specifically includes an inner bore of increasing radius, or alternatively an inner spacer, to uniformly support the heating element shown in FIGS. 8A and 8B, according to embodiments of the present disclosure.
Figure 8D:
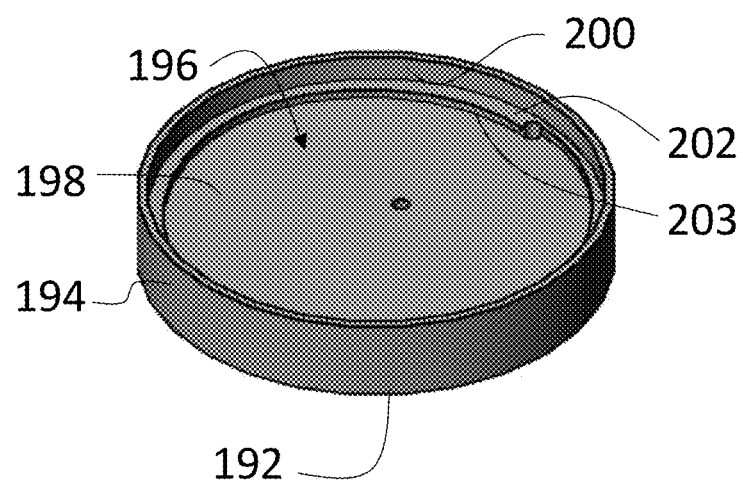

FIGS. 8C and 8D are schematic images showing top-down and perspective views of a heater block body 190 that specifically includes an inner bore of increasing radius to more uniformly support the heating element 180 shown in FIGS. 8A and 8B. The heater block body 190 has the shape of a cup, which includes a generally cylindrically-shaped bottom plate 192 with a side-wall 194 extending up from the bottom plate 192.

Figure 8E:
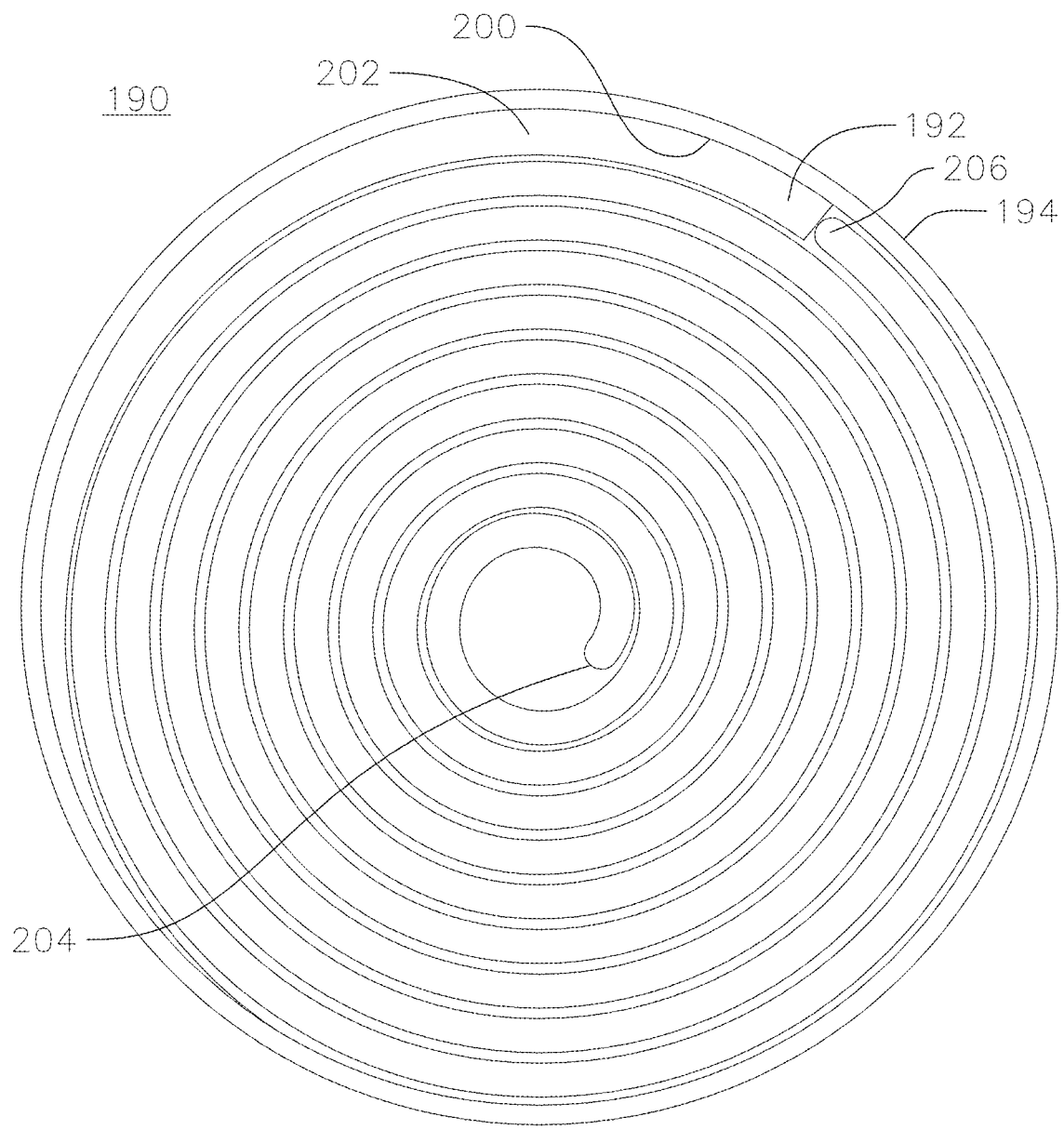
FIGS. 8E and 8F are schematic images showing top-down and perspective views of the heating element after insertion into the heater block body including the inner spacer.
Figure 8:
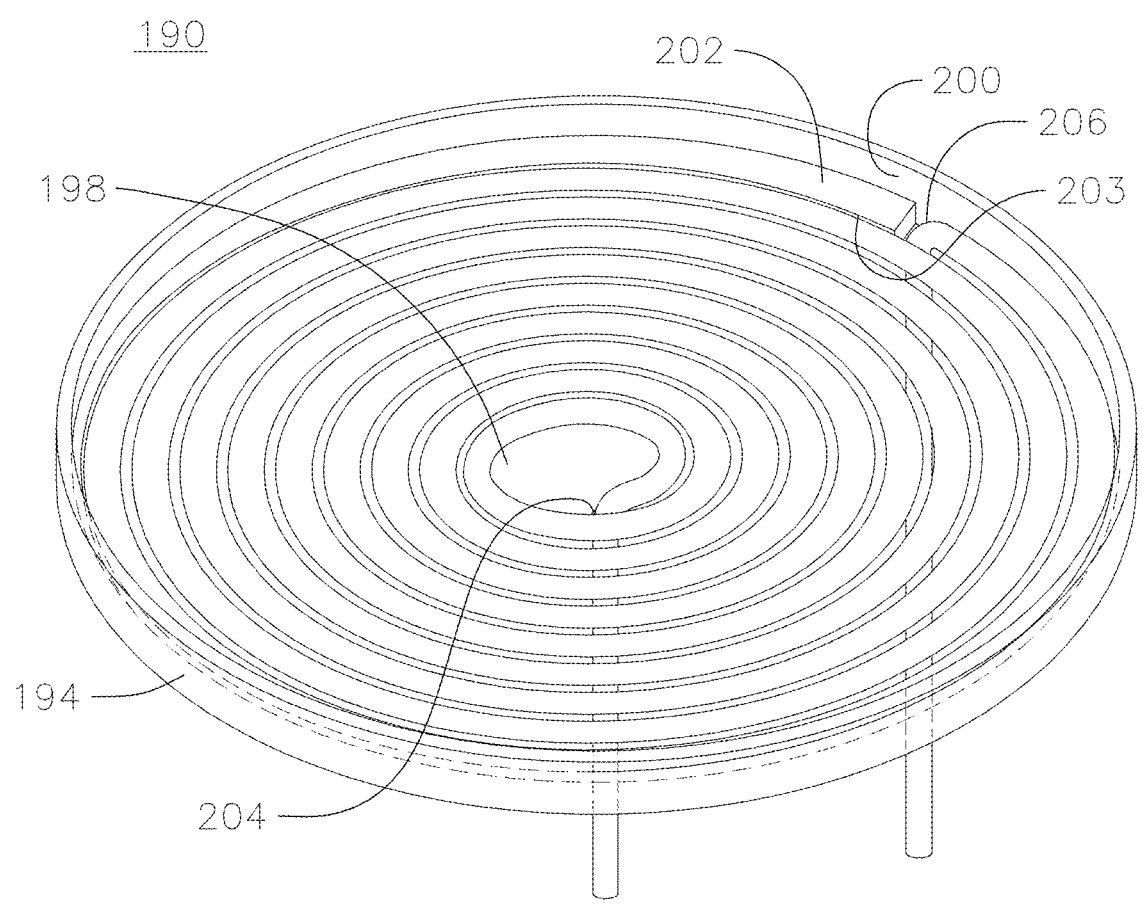

The bottom plate 192 and side-wall 194 create an internal cavity 196 bounded by the inner lower surface 198 and the inner side-wall surface 200. The inner lower surface 198 and the inner side-wall surface 200 are not flat (e.g., not described by a simple plane or the internal curve of a cylinder wall), but include an interior feature 202 (e.g., inner spacer) that closely follows the shape of the spirally coiled wire 182. The interior feature (inner spacer) 202 can be described as a shelf that extends around the perimeter of the inner lower surface 198 and rises up the side of the inner side-wall surface 200 of the heater block body. The interior feature (inner spacer) 202 has a height 203 substantially equivalent or close to the desired height of the heating element under compression so that a circular heater block lid is still able to be compressed against the heating element 180 without being occluded or held up by the top surface of the interior feature 202. The interior feature (inner spacer) 202 has a variable lateral width (thickness) so that the interior feature 202 acts as a spacer that fills the lateral space around the heating element (e.g., the negative space that would surround the heating element if it were to be circumscribed within an ideal circle having a diameter equivalent to the inner diameter of the internal cavity 196). Accordingly, when the heating element 180 is placed within the heater block body 190 so that the end leads 184 and 186 of the heating element 180 extend through holes 204 and 206 in the heater block body 190, the coiled wire 182 is supported (e.g., in contact with the lower surface 198 and the inner side-wall surface 200) along its entire lower surface 181 and lateral perimeter surface 183. FIGS. 8E and 8F are schematic images showing top-down and perspective views of the heating element 180 after insertion into the heater block body 190 including the interior feature (inner spacer) 202.

A heater block lid can be optionally prepared using similar guidelines so that the heating element 180 is supported along its entire upper surface as well. Further, other heater block housing parts such as those described in FIGS. 3 to 6 can be prepared using similar methods according to the principles described herein.

Such interior features or inner spacers of the heater block housing parts may be formed or processed using any suitable method. In some embodiments, for example, when the heater block housing parts are cast or extruded, the interior feature 202 on the inner lower surface 198 and the inner side-wall surface 200 of the heater block body, a well as similar features on the heater block lid, may be formed into the part during casting or extrusion. In some embodiments, for example, when the heater block housing parts are machined, the interior features 202 and 204 and similar features of the heater block lid may be formed by cutting out a layer of material that matches the profile of the heating element, for example, by machining, milling, or boring out a layer or channel of material that matches the area (footprint) of the heating element.

Alternatively, in some embodiments, the interior feature or inner spacer in the inside of the heater block housing may be produced in the form of separately manufactured shims or inserts that are subsequently placed inside the heater block housing around the lateral perimeter of the heating element, for example, between the perimeter surface of the heating element and the inner side wall surfaces of the heater block housing.

Figure 9A:
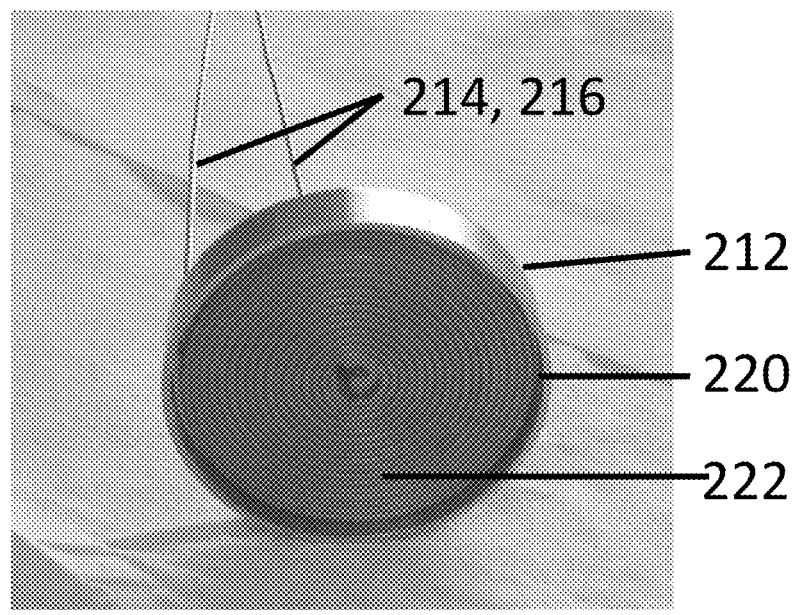
FIGS. 9A and 9B are photographic images showing a coiled wire heating element installed within a cup-shaped heater block body from above and below, respectively, according to embodiments of the present disclosure.
Figure 9B:
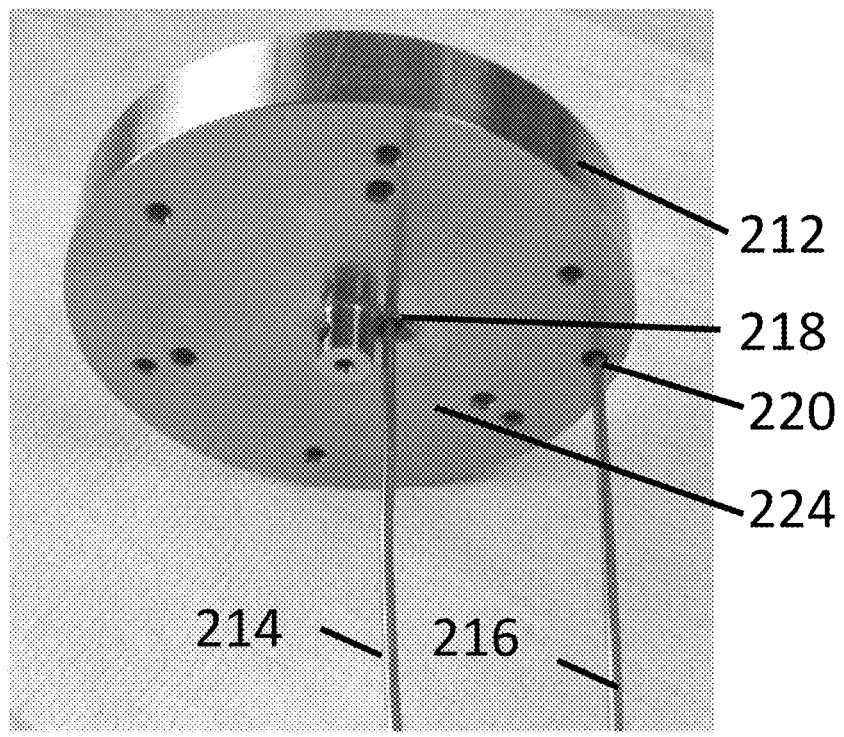

To assemble the heating device, the heating element is placed on or in the heater block body so that the wire leads pass through the holes in the heater block body and the bottom surface of the heating element is flush and in contact with the bottom surface of the heater block body. FIGS. 9A and 9B are photographic images showing a coiled wire heating element 220 installed within a cup-shaped heater block body 212 so that the leads 214 and 216 pass through holes 218 and 220 in the heater block body 212. FIG. 9A shows the upper surface 222 of the heating element 210 after installation in the heater block body 212, while FIG. 9B shows the outer lower surface 224 of the heater block body 212 after installation of the heating element 210.

Figure 9C:
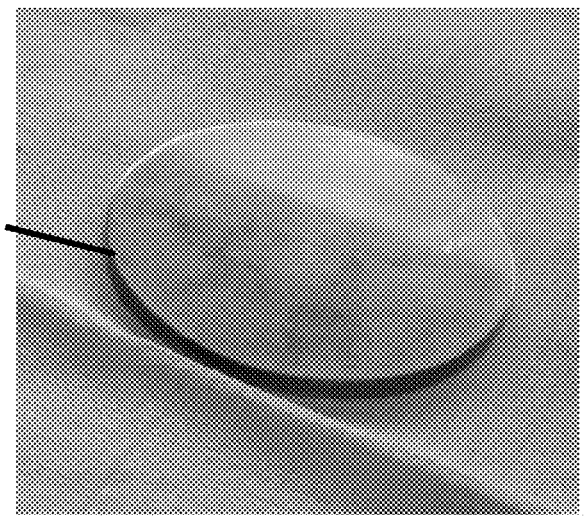
FIG. 9C is a photographic image showing a heater block lid having the general shape of a plate, according to embodiments of the present disclosure.
Figure 9D:
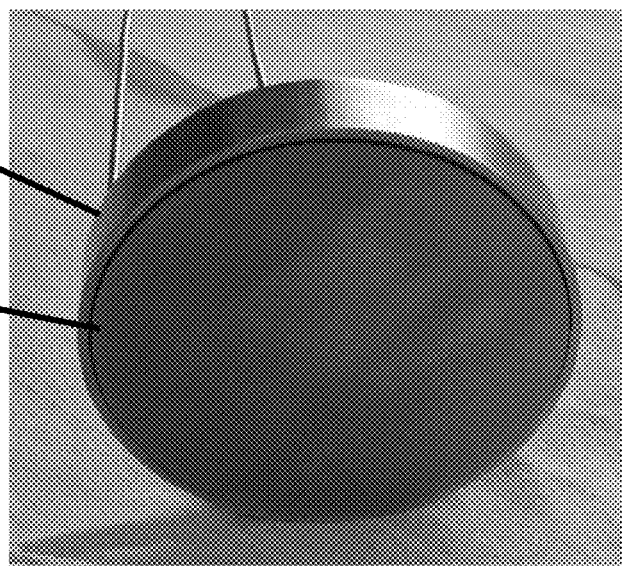
FIG. 9D is a photographic image showing the heater block lid positioned on the upper surface of the heating element shown in FIG. 9A, according to embodiments of the present disclosure.

The heater block lid is subsequently placed on the upper surface of the heating element so that the heating element is sandwiched between the heater block lid and the heater block body. FIG. 9C is a photographic image showing a heater block lid 230 having the general shape of a plate. FIG. 9D is a photographic image showing the heater block lid 230 positioned on the upper surface 222 of the heating element 210 shown in FIG. 9A. The outer diameter of the heater block lid 230 is equal to or smaller than the inner diameter of the heater block body 212 so that the heater block lid 230 is able to fit inside of the heater block body 212, as shown by the black line (space) between the heater block lid 230 and the inside of the heater block body 212.

The heating device is then compressed along a vector normal to the work surface of the heating device (e.g., vertically in the case of the platen-type heating devices shown in FIGS. 2 to 4 and 6, and/or radially in the case of the cylindrical heating device shown in FIGS. 5 and 6) by pushing the heater block lid into the heater block body to promote uniform thermal contact between the at least the upper and lower surfaces of the heating element and the inner surfaces of the heater block body and heater block lid. The pressure compresses the heating element such that the outer protective sheath of the resistive heating wire that forms the heating element is deformed (e.g., the outer diameter d of the outer protective sheath 176 shown in FIG. 7 is decreased relative to its initial uncompressed diameter in a direction parallel to the direction of applied force), thus immobilizing the heating element within the heater block housing and forming a continuous physical and thermal contact between the heating element and the heater block housing. When the amount of compression is insufficient (e.g. too low), suitable thermal contact may not be achieved, the heating element may transfer heat to the substrate unevenly, and local hot spots may form, causing failure of the heating element. However, when the amount of compression is too high, the insulating powder in the heating wire may be displaced, such that the inner resistive wire and the outer protective sheath come into electrical contact and form a short circuit, or the outer protective sheath may crack and allow oxygen to enter and corrode the inner resistive wire. Therefore, the amount of compression should be carefully controlled.

In some embodiments, the compressed outer diameter ($d_1$) of the resistive heating wire along the direction of compression is less than about 20% of its initial uncompressed diameter; for example, about 2.5% to about 20%, or about 2.5% to about 15% of its initial uncompressed diameter. In some embodiments, the compressed outer diameter of the resistive heating wire along the direction of compression is about 3% to about 10% of its initial uncompressed diameter; for example, about 5% to about 7% of its initial uncompressed diameter.

The amount of pressure applied to the heating device during assembly may be any amount of pressure capable of producing the wire diameter compression ranges described above. In general, the amount of pressure required to produce said compression ranges should increase as the diameter of the heating wire used to form the heating element is increased. In some embodiments, for example when the heating device is a circular platen heater having a lateral diameter of about 2.5" and including a cup-shaped heater block body, a plate shaped heater block lid that fits within the heater block body to thereby make contact with the heating element positioned within, and a heating element formed of 0.0625" wire sheathed in Inconel 600, the compressing force applied to the heating element between the heater block body and lid may be about 280 psi, but embodiments of the present disclosure are not limited thereto.

In some embodiments, the heating element and the resistive heating wire used to form the heating element may experience compression and/or deformation along a second direction normal to the first (e.g., vertical or radial) direction. For example, when the heating wire is compressed along a first (e.g., vertical) direction, the packing density of the heating wire may be increased to the extent that voids exist in the uncompressed heating wire. However, the capacity for increased packing density is finite for any material or object, and any additional compressive force may cause the heating wire to deform outward (e.g., expand) in a direction normal to the first direction so that the heating wire maintains a constant internal pressure and volume. In the case that the heating element is supported along that second direction in both directions (e.g., the lateral perimeter of the heating element is adjacent to an inner surface of the heater block housing, for example a surface of an inner wall or inner spacer), the degree of deformation along that second direction is limited by those inner surfaces of the heater block housing. The pressure of these additional inner surfaces of the heater block housing against the heating element causes compression to be applied to the heating element along the second direction. In some embodiments, a heating element formed by coiling or winding a heating wire having a circular uncompressed cross-section may be compressed and deformed along a first direction and a second direction perpendicular to the first direction to thereby form a compressed cross-section having the shape of a square with rounded corners. The heating element may thus be capable of forming uniform and continuous physical and thermal contacts with multiple inner heater block housing surfaces, including perpendicularly oriented surfaces when the heating element is compressed and deformed against these multiple surfaces.

The heating device is held in place under pressure as described above, and the heater block lid is attached or joined to the heater block body using any method that does not use a braze alloy (e.g., any braze-free method). For example, the heater block lid and heater block body may be joined using a fusion welding process, press fitting, or via mechanical fasteners (such as bolts, clamps, etc.).

In some embodiments, the fusion weld joining the first and second heater block housing parts (e.g., the heater block body and heater block lid) may be performed using any high cleanliness welding technique. As used herein, the term "high cleanliness" refers to any welding technique that does not result in oxidation of the materials to be welded, and therefore avoids slag formation that can cause pitting and other weld joint defects. For example, the welding technique may use an inert shield gas such as argon (Ar). Non-limiting examples of suitable welding techniques may include electron beam, laser, and metal inert gas (MIG) welding. In some embodiments, the fusion weld may be performed via Tungsten Inert Gas (TIG) welding. The fusion weld may be performed while the system is compressed as described above.

In some embodiments, the fusion weld may be performed between adjacent surfaces of heater block housing parts. For example, when the heating device is a platen-type assembly similar to those shown in FIGS. 2 and 3 (e.g., a heating device including a heater block body shaped like a cup and heater block lid shaped like a plate, or vice versa, the weld may join the outer perimeter of the heater block lid and the upper rim of the heater block body side-wall (e.g., the outer perimeter of a heater block body shaped like a plate and the lower rim of the side-wall of a heater block lid shaped like an inverted cup). In some embodiments, when the heating device is a platen-type assembly similar to that described in connection with FIG. 4 (e.g., including two plates), the weld may be performed between facing surfaces around the perimeter of the plates, or between their matched rims (when present). In some embodiments, when the heating device is a cylindrical assembly similar to that described in connection with FIG. 5, the weld may be performed between facing surfaces at the lengthwise ends of the cylindrically shaped inner and outer heater block body parts. In some embodiments, when the heating device forms a cup shape similar to that described in connection with FIG. 6, the weld may be performed between facing surfaces at the rims of the cup-shaped upper and lower heater block body parts. However, it will be understood that those having ordinary skill in the art are capable of selecting suitable weld sites and surfaces.

In some embodiments, when the weld bead is on, adjacent to, or surrounding the perimeter of the heating device work surface (e.g., the upper surface of the heater block lid in FIGS. 2 to 4), the weld bead and the edge of the work surface may be chamfered or filleted (e.g., in a lathe) to produce a finished product having a flat work surface that can be easily cleaned (e.g., by wiping, sanding, sandblasting, applying solvents or other cleaning agents, etc.) prior to use.

In some embodiments, when the first and second heater block parts (e.g., heater block lid and heater block body) are joined using a mechanical fastener, the mechanical fasteners may be tightened or adjusted so that the heating element is compressed at a suitable pressure, as described herein. Those having ordinary skill in the art are capable of selecting suitable numbers, positions, geometries, and types of mechanical fasteners. In some embodiments, the mechanical fasteners (e.g., clamps) may be positioned near and/or around the outer perimeter of the heater block lid.

In some embodiments, when the heating device is a platen type heating device having a circular base shape, the heating device may be assembled as follows. First, a heating wire may be coiled into a planar circular shape and laser welded to maintain said shape, with two wire leads extending perpendicular to the planar coiled shape, thereby forming a heating element. Second, the heating element may be placed inside the cavity of a cup-shaped heater block body or alternatively on a plate-shaped heater block body so that the planar shape of the heating element is parallel to the inner bottom surface of the heater block body, and the wire leads may be guided through holes or openings in the heater block body to extend therethrough. The wire leads may serve as electrical contact points for connection to an controller for supplying electrical energy (e.g., via a voltage and/or current) to the heating element. Next, a heater block lid may be placed on the heating element so that the heating element is sandwiched between the lower surface of the heater block lid and the upper surface of the heater block body, and is enclosed or partially enclosed between the two without inclusion or use of a braze alloy. The resulting stack may be compressed (e.g., vertically compressed or radially compressed) so that the heating element is compressed between the housing parts, and in some embodiments, the outer sheath of the heating wire that forms the heating element may be compressed and deformed along the direction of compression, for example, along a direction between the heater block body and the heater block lid, as described herein. The heater block lid is then joined to the heater block body using a fusion weld or mechanical fasteners, as described herein. Accordingly, the heater block lid and heater block body maintain the compression (compressive force) on the heating element after the heating device is assembled. The above described method of preparing a platen-type heating device may be adapted to other heating devices according to the principles described herein.

Figure 10A:
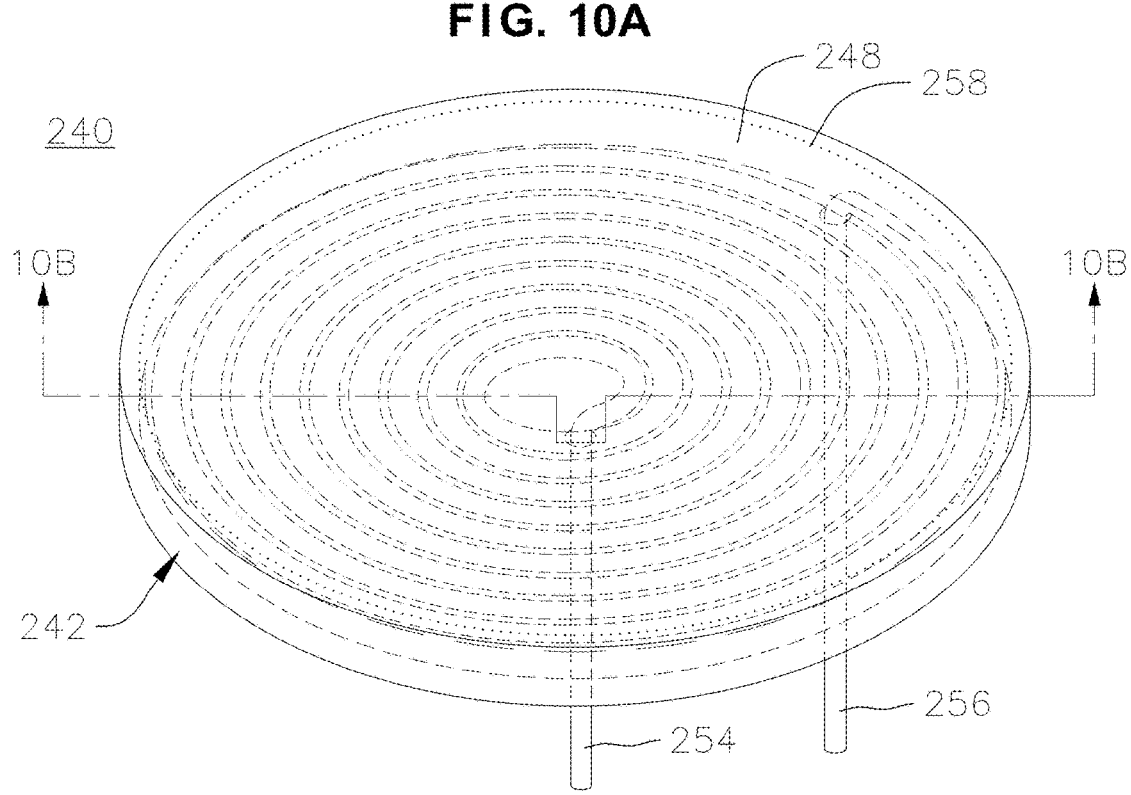
FIG. 10A is a schematic plan view showing an assembled platen type heater block having the general shape of a cylinder.
Figure 10B:
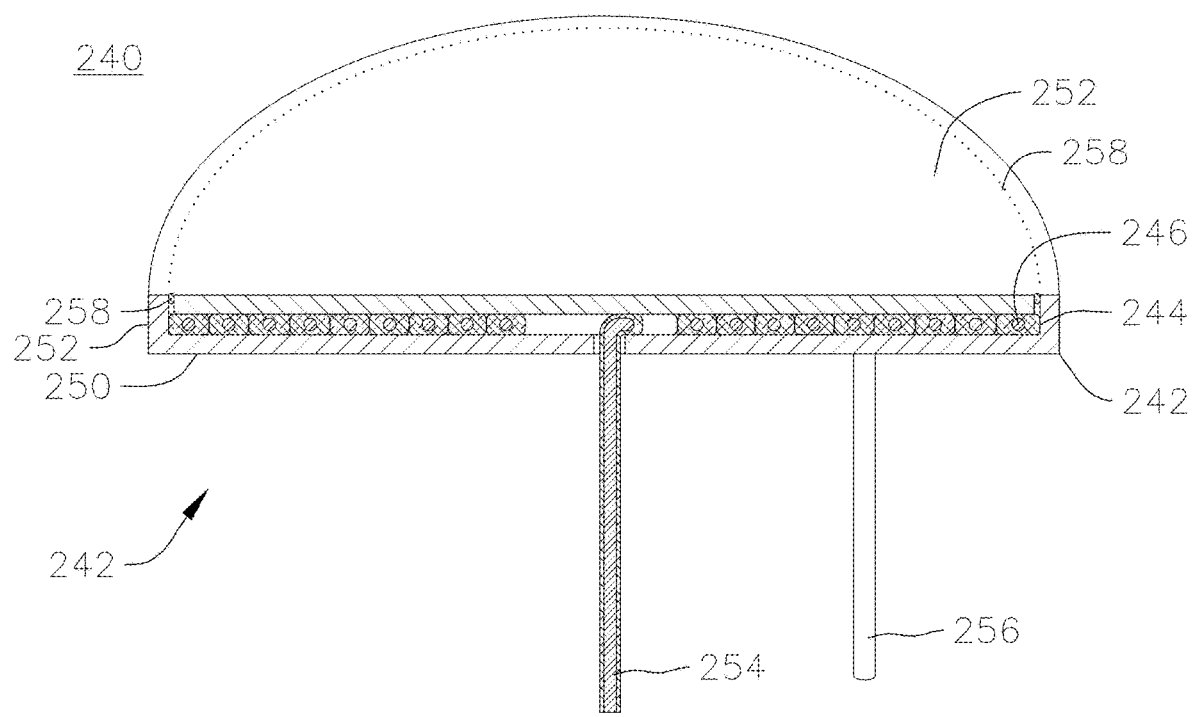
FIG. 10B is a schematic cross-sectional view of the assembled platen type heater block of FIG. 10A taken along line I-II, according to embodiments of the present disclosure.

FIG. 10A is a schematic plan view showing the assembled platen type heater block 240 having the general shape of a cylinder. FIG. 10B is a schematic cross-sectional view of the assembled platen type heater block 240 of FIG. 10A taken along line I-II. In FIGS. 10A and 10B, the heater block 240 is formed from a heater block body 242 having the shape of a cup, a heating element 244 formed from a coiled heating wire 246 in the shape of a planar disk, and a heater block lid 248 having the shape of a circular plate. The heater block body 242 is formed from a bottom plate 250 and side-wall 252. The dotted line 258 shows the former weld boundary between the heater block lid 248 and the side-wall 252 of the heater block body 242. The work surface 260 is the upper surface of the heater block 240 and the heater block lid 248.

The heating wire 246 includes leads 254 and 256 extending through holes in the heater block body 242 (see, e.g., FIG. 2). As shown in FIG. 10B, the heating wire 246 of the heating element 244 is vertically compressed between the heater block body 242 and the heater block lid 248. This compression results in good physical and thermal contact between the heating element 244 and the heater block lid 248 at an interface 250 opposite the work surface 260, such that heat is efficiently and uniformly transferred to the work surface 260.

In some embodiments, a heat shield may be attached to the heating device to reduce the amount of heat that is radiated from heating device surfaces that are not the work surface. The shape and form of the heat shield is not particularly limited. In some embodiments, for example when the heating device is a platen heater having a planar work surface and perpendicular side-walls, the heat shield may be formed as an additional band or outer wall that is placed around the perimeter of the side-walls. In some embodiments, when the heating device is shaped like a cup or ring having an work surface within the cup cavity or along the concave inner diameter of the ring, the heat shield may form an wall along the outside surface of the cup or the outer diameter of the ring.

The heat shield may be separated from the heater block housing by an air or vacuum gap in order to limit conductive and/or radiative heat transfer from the heater block to the heat shield. The gap distance is not particularly limited, and in some embodiments, may be about 2 mm to about 1 cm, or about 4 mm to about 7 mm. The heat shield may be formed of any material that is thermally insulating or heat resistant. In some embodiments, for example, the heat shield may be formed of an insulating ceramic, a thermally reflective metal band, or a combination of layers thereof. The method and attachment points used to attach the heat shield around the heater block are not particularly limited. In some embodiments, the heat shield may be held around the side-wall perimeter or outer cup/ring surface via attachment points located on the bottom or side of the heating unit, using fasteners such as screws or clamps.

In some embodiments, insulating ceramic stands may be attached to the bottom of the heating device to provide a mount and to hold the heater block away from heat-sensitive counters, tabletops, chamber walls, etc. Any insulating ceramic material may be used. The ceramic stands may be attached to the heater block using any suitable method, for example, using fasteners such as screws. The number, height (length), shape, and thickness (diameter) of the ceramic stands are not particularly limited as long as the heater block is physically stable and the stands are resistant to bending and breakage. In some embodiments, for example, the heating device may include at least three cylindrical ceramic stands having an outer diameter of at least 1 cm. Both attachments may prevent or reduce unwanted heat transfer and damage to the environment, and/or facilitate safer operation and handling.

Figure 11:
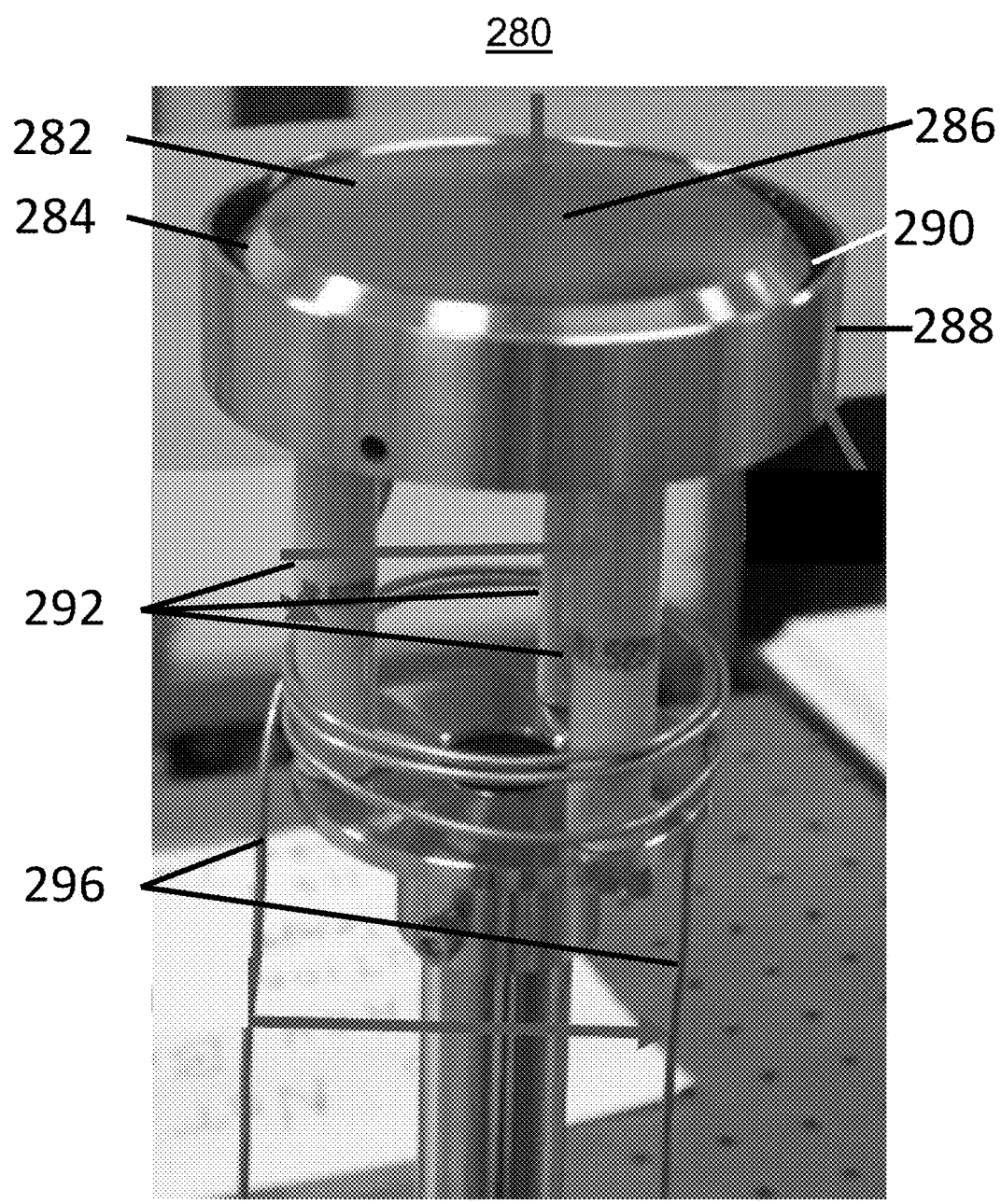
FIG. 11 is a photographic image of an example embodiment of an assembled braze-free platen-type substrate heating device including a heater block that has been assembled by welding and further processed with a chamfered weld bead around the work surface. The heating device includes a metal heat shield and insulating ceramic stands, according to embodiments of the present disclosure.

FIG. 11 is a photographic image of an example embodiment of an assembled braze-free platen-type substrate heating device 280 including a heater block 282 that has been assembled by welding and further processed with a chamfered weld bead 284 around the work surface 286. The heating device 280 includes a metal heat shield 288 having the general shape of an open cylinder and surrounding the lateral perimeter 290 of the heater block. The heating device 280 further includes three insulating ceramic stands 292 attached to the bottom of the heater block 282, through which the heating device is mounted on a metal shaft 294. Insulated leads 296 connecting the heating element inside the heater block 282 are wrapped around the insulating ceramic stands 292. However, the heat shield and insulating ceramic stands of the example embodiment should not be construed as limiting the embodiments of the present disclosure. For example, alternate components including different materials and having different forms may be used with the heating unit. In addition, the heating unit or elements of the heating unit may be integrated into other devices; for example, the heating device may be bonded to the side of a box to produce an oven, or the heating unit may be embedded in a ceramic slab to produce a heating plate.

Figure 12A:
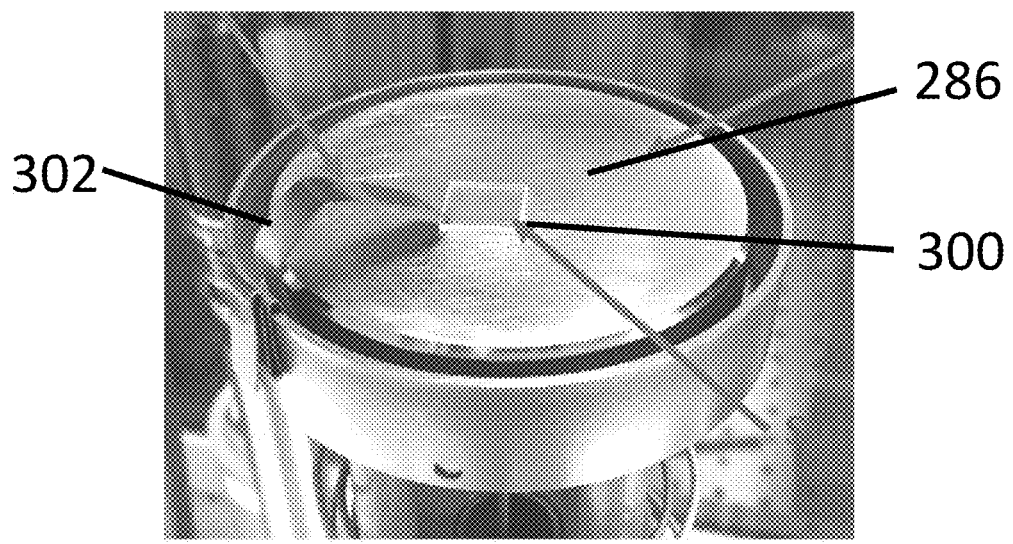
FIG. 12A is a photographic image showing a substrate (clear rectangle shape) attached to the work surface of the heating device shown in FIG. 11 by a clip (e.g., mechanical clamp), according to embodiments of the present disclosure.
Figure 12B:
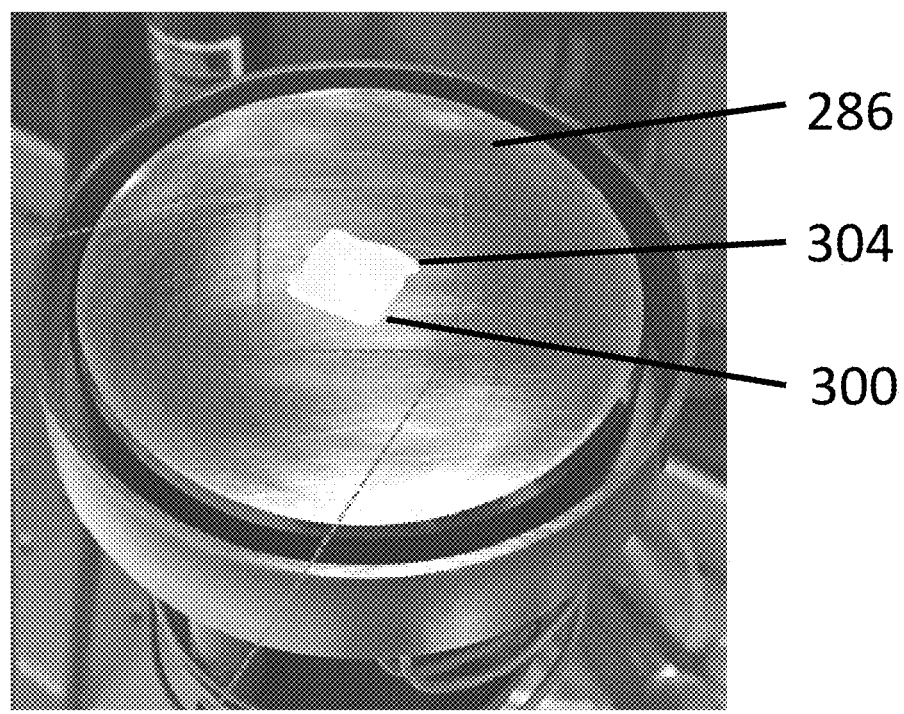
FIG. 12B is a photographic image showing a substrate attached to the work surface using silver paste or epoxy, according to embodiments of the present disclosure.

In the platen-type heating device of FIG. 11, the work surface (heating surface) 286 is substantially formed as the upper external surface of the heater block lid used to form the heater block 282 (see. FIG. 2). A substrate or work piece may be attached to the work surface 286 to encourage thermal contact and heat transfer between the substrate heating device and the substrate. The method of attachment is not particularly limited as long as the material or mechanism used to attach the substrate is stable to the temperatures and pressures needed to process the substrate. FIG. 12A is a photographic image showing a substrate 300 (clear rectangle shape) attached to the work surface 286 by a clip (e.g., mechanical clamp) 302. FIG. 12B is a photographic image showing a substrate 300 attached to the work surface 286 using silver paste or epoxy 304. However, it will be understood that these images are merely illustrative, and other substrate forms, attachment methods, etc. may be used with other embodiments of the present disclosure.

A braze-free substrate heating device according to embodiments of the present disclosure was assembled and subsequently evaluated. The following examples and experimental data are provided for illustrative purposes only, and do not limit the scope of the embodiments of the present disclosure.

EXAMPLES

Example 1

A braze-free substrate heating device according to embodiments of the present disclosure was assembled using commercially available heating wire (Thermocoax) having an Inconel® 600 (625) outer protective sheath with an outer diameter of 0.0625 inches; a cylindrical heater block body of Inconel® 600 (625) with an inner diameter of 2.45 inches, an outer diameter of 2.5 inches, and a depth of 0.20 inches; and a heater block lid of Inconel® 600 (625) with a diameter of 2.45 inches and a thickness of 0.165 inches. The heating element was coiled into a planar disk having an outer diameter of 2.375 inches. The heating element coil was placed inside the heater block body and the heater block lid was placed on the heating element coil to assemble a heater block.

Pressure (about 280 psi) was applied to the heater block lid so that the diameter of the outer protective sheath of the heating wire was compressed by 5% relative to its initial uncompressed diameter. The heater block lid was TIG welded to the heater block body at the interface between the heater block lid perimeter and the heater block body sidewall, the weld bead was chamfered in a lathe, and the heating device was mounted in a heat shield and on insulating ceramic stands to thereby produce the substrate heating device of Example 1.

Cycling tests were performed as follows. The substrate heating device was heated from room temperature (25° C.) to a final (maximum) temperature of 900° C. at a ramp (e.g., temperature increase rate) of 25° C. per minute. The substrate heating device was held at the final temperature for 10 minutes. The current applied to the resistive heating wire was turned off and the substrate heating device was allowed to cool in air to room temperature. The heating and cooling cycle was subsequently repeated for a total of 10 cycles.

The substrate heating device was disassembled at the end of the $10^{th}$ cooling cycle and inspected for internal damage or wear, as evidenced by coil splitting or warping, weld tearing, changes in the internal resistance of the heating wire, or markings or scratches on the heater block body or heater block lid. No internal damage was observed for the substrate heating device of Example 1. In addition, the markings caused by thermal imprinting of the heating element on the heater block body and heater block lid were observed to be uniform and symmetric, suggesting uniform thermal contact of the heating element with the outer housing.

The substrate heating device was reassembled and the cycling test was repeated with a final (maximum) temperature of 1,000° C., a ramp of 25° C. per minute, a hold time of 10 min at the final temperature, and a total of 10 cycles. Once again, the substrate heating device of Example 1 was disassembled and no internal damage was observed. The heating device of Example 1 was thus found to exhibit improved stability and reliability over brazed-processed heaters in the related art (see, e.g., FIG. 1).

Figure 13:
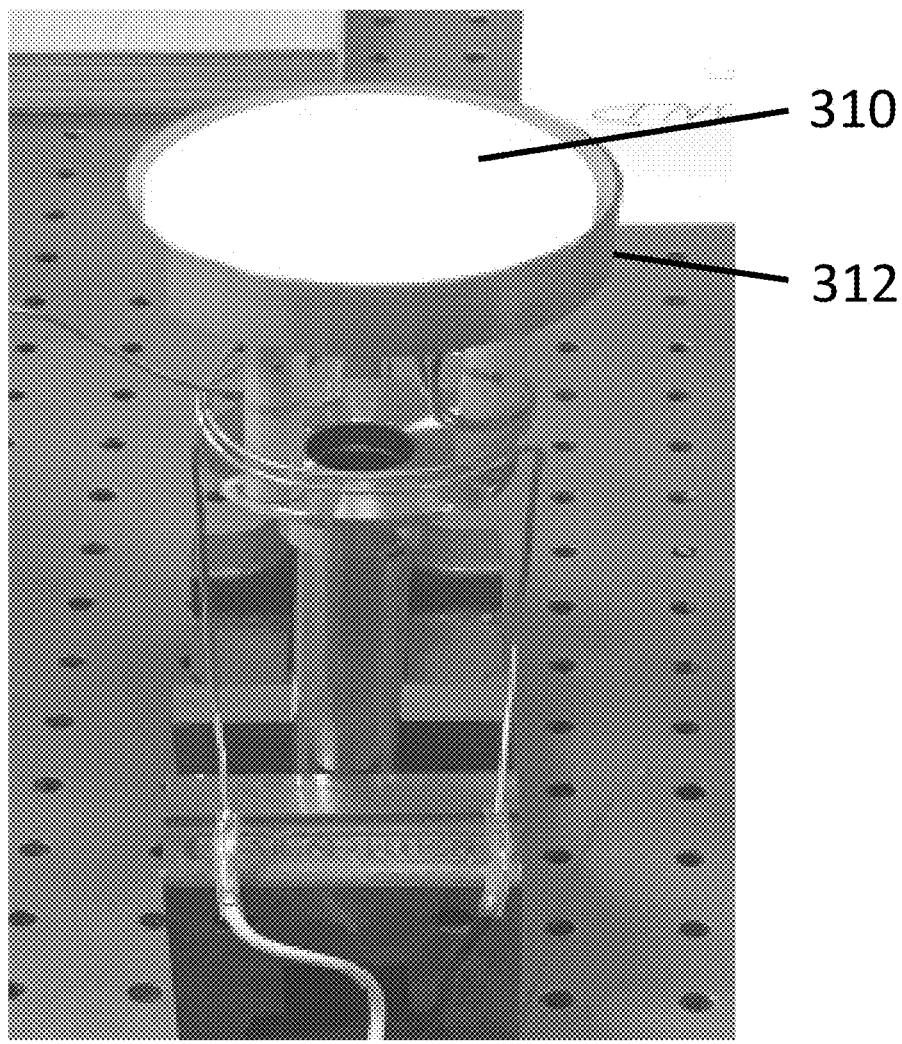
FIG. 13 is a photographic image of the substrate heating device of Example 1 being operated at 1,000° C. in air, according to embodiments of the present disclosure.

FIG. 13 is a photographic image of the substrate heating device of Example 1 being operated at 1,000° C. in air. The bright color (incandescence) of the work surface 310 relative to the heat shield 312 (and compared to the silver color of the work surface at room temperature, as shown in FIGS. 12A and 12B) is indicative of the effective heat transfer from the heating element to the adjacent work surface 310, as enabled by the compression of the heater block housing, as well as the effective thermal shielding behavior of the heat shield 312. The heating element has a maximum operating temperature of about 1,200° C.; thus, the substrate heating device has an operating safety margin of about 200° C. to about 400° C. at routinely used operating temperatures (e.g., up to about 800° C. to 1000° C.). It should be noted that operation in air is more stressful to the heating element than operation under vacuum or low pressure because the higher degree of conductive cooling in air requires the heating element to draw more electrical current to maintain the same temperature. As such, the performance and durability of the heating device of Example 1 under vacuum is expected to be further improved over the measurement presented herein. The heating device of Example 1 was thus found to have a higher operating temperature range over brazed-processed heaters in the related art, which are limited by the melting point of the braze alloy.

The temperature uniformity across the central 2" diameter of the heater block lid was measured using an optical pyrometer (Minolta/Land Cyclops model 52). The outer 0.125 inch radius of the heater block lid was not included in the assessment due to the expectation that it would experience greater heat loss to conductive and radiative cooling in air. The temperature was found to be uniform within ±5° C. over this central area, with the largest variation in temperature corresponding to a hole in the middle of the coiled heating element, due to the heating wire having a non-zero minimum bending radius. The heating device of Example 1 was thus found to exhibit good or suitable work surface temperature uniformity.

Finally, an experiment was conducted to compare the amounts of vaporized material released by the braze-free substrate heating device of Example 1 and a standard brazed heater using a braze alloy of 50/50 Au/Cu (e.g., as a Comparative Example). The tests were performed in a spherical vacuum deposition chamber with an internal volume of approximately 66 liters. The chamber was continuously pumped at a speed of 400 liters/second by an Alcatel model 5400 turbo molecular pump. Since the standard brazed heater of the Comparative Example is not capable of operating at the extreme temperatures enabled by the example substrate heating device, all tests were performed at a temperature of 780° C., which is a typical temperature for thin film growth.

Figure 14:
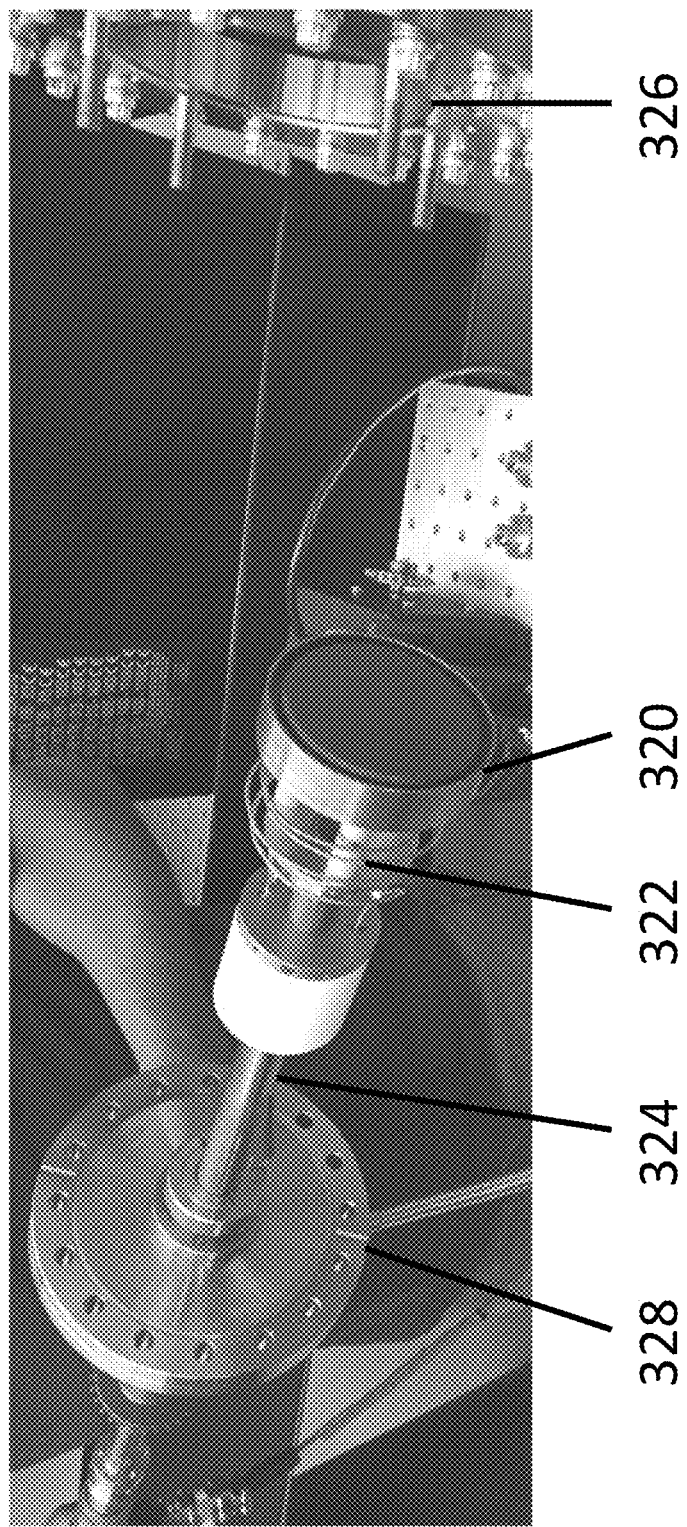
FIG. 14 is a photographic image showing the setup and mounting of the braze-free substrate heating device of Example 1 for use in a typical vapor deposition system and for the comparison of vaporized material, according to embodiments of the present disclosure.

FIG. 14 is a photographic image showing the setup and mounting of the braze-free substrate heating device of Example 1 for use in a typical Pulsed Laser Deposition System and for the comparison of vaporized material. FIG. 14 shows the substrate heating device of Example 1 (320) mounted on insulating ceramic stands 322 and attached to the end of a heater shaft assembly 324 that is to be inserted into a vacuum chamber 326. The heater shaft assembly 324 includes a door 328 for sealing the vacuum chamber 326.

The brazed heater was loaded into the vacuum chamber at 25° C. and pumped with the heater off to a base pressure of $3.8 \times 10^{-7}$ Torr after 12 hours. The chamber was maintained under active vacuum pumping, and the heater was heated to 780° C. and held at temperature for 0.5 hour. During this time, the system base pressure increased to $2.5 \times 10^{-5}$ Torr. This is an extremely large increase in background pressure considering the chamber was actively pumped during the entire experiment.

Next, the substrate heating device of Example 1 was loaded into the vacuum chamber and heated to 950° C. under atmospheric pressure for 3 hours in order to remove any internal material left from the previous test. The substrate heating device and the vacuum chamber were allowed to cool back to 25° C.

After cooling to 25° C., the system was pumped with the heater off to a base pressure of $2.2 \times 10^{-7}$ Torr after 12 hours. The slight improvement may be due to the high temperature bake out. Under active vacuum pumping, the example substrate heating device was heated to 780° C. and held at temperature for 0.5 hour. During this time, the system base pressure increased to $2.0 \times 10^{-6}$ Torr, more than an order of magnitude better vacuum than the standard brazed heater.

In both cases, the increase in pressure may be mainly attributed to outgassing of the chamber walls. However, the larger increase in pressure for the brazed heater of the Comparative Example suggests that a contaminant that is present in the brazed heater (but not the example substrate heating device) was evaporating into the vacuum chamber. Taken together with the image data of FIG. 1, it is reasonable to assume that these contaminants originate from the braze alloy used to construct the brazed heater. Accordingly, the heating device of Example 1 was thus found to produce lower levels of vapor contamination compared to brazed-processed heaters in the related art, demonstrating that the heating device according to embodiments of the present disclosure may be more suitable for use in contamination-sensitive applications and materials.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of", "one of", "selected from", and "one selected from", when preceding a list of elements, modify the entire list of elements and do not modify the individual elements of the list. Further, the use of "may" when describing embodiments of the inventive concept refers to "one or more embodiments of the inventive concept." As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the drawings, it will be understood by those of ordinary skill in the art that various changes in form and details may be made therein without departing from the spirit and scope as defined by the following claims and equivalents thereof.

What is claimed is:

1. A braze-free device for heating a substrate, the braze-free device comprising:
    a heater block body,
    a heater block lid on the heater block body; and
    a heating element between the heater block lid and the heater block body;
    the heating element being compressed between the heater block body and the heater block lid along a first direction between the heater block lid and the heater block body to deform the heating element along the first direction,
    the heating element being in continuous physical and thermal contact with the heater block lid and the heater block body without including a braze alloy,
    wherein the heating element comprises a resistive heating wire having an outer protective sheath, and a compressed outer diameter of the resistive heating wire in the first direction is about 2.5% to about 20% of an uncompressed outer diameter of the resistive heating wire.

2. The braze-free device of claim 1, wherein the first direction is a vertical direction, and the heating element is in substantially continuous surface contact with an upper inside surface of the heater block body and a lower inside surface of the heater block lid.

3. The braze-free device of claim 1, wherein the first direction is a vertical direction, and the resistive heating wire is coiled in a plane.

4. The braze-free device of claim 1, wherein the first direction is a radial direction, and the heating element is in substantially continuous surface contact with a convex inside surface of the heater block body and a concave inside surface of the heater block lid.

5. The braze-free device of claim 1, wherein the first direction is a radial direction, and the resistive heating wire is coiled in the shape of a cylinder.

6. The braze-free device of claim 1, wherein the compressed outer diameter of the resistive heating wire in the first direction is about 5% to about 7% of the uncompressed outer diameter of the resistive heating wire.

7. A braze-free device for heating a substrate, the braze-free device comprising:
    a heater block body,
    a heater block lid on the heater block body; and
    a heating element between the heater block lid and the heater block body; the the heating element comprising a resistive heating wire having an outer protective sheath and being compressed between the heater block body and the heater block lid along a first direction between the heater block lid and the heater block body to deform the heating element along the first direction,
    the heating element being in continuous physical and thermal contact with the heater block lid and the heater block body without including a braze alloy,
    wherein the outer protective sheath, the heater block body, and the heater block lid are each made of a high temperature metal or alloy having a coefficient of thermal expansion, the coefficients varying by about 0% to about 10%.

8. The braze-free device of claim 7, wherein the coefficients are substantially identical.

9. The braze-free device of claim 7, wherein the high temperature metal or alloy comprises molybdenum (Mo), chromium (Cr), nickel (Ni), tungsten (W), tantalum (Ta), titanium (Ti), cobalt (Co), iron (Fe), niobium (Nb), or a mixture thereof.

10. The braze-free device of claim 1, wherein the heater block body or the heater block lid includes an inner spacer to fill the lateral space around the lateral perimeter of the heating element.

11. The braze-free device of claim 1, wherein the heating element is further compressed along a second direction, the second direction being perpendicular to the first direction.

12. A method of constructing a substrate heating device without brazing, the method comprising:
    coiling a resistive heating wire to form a heating element, the resistive heating wire having an outer protective sheath;
    placing the heating element between a heater block body and a heater block lid;
    compressing the heating element between the heater block body and the heater block lid along a first direction between the heater block body and the heater block lid to deform the heating element along the first direction;
    forming substantially continuous physical and thermal contacts between the heating element and the heater block lid and the heating element and the heater block body without including a braze alloy; and
    attaching the heater block lid to the heater block body,
    wherein compressing the heating element between the heater block body and the heater block lid compresses an outer diameter of the resistive heating wire in the first direction by about 2.5% to about 20%.

13. The method of claim 12, wherein the resistive heating wire is coiled in a plane, the first direction is a vertical direction, and the contacts are formed with an upper inside surface of the heater block body and a lower inside surface of the heater block lid.

14. The method of claim 12, wherein the resistive heating wire is coiled around the heater block body, the first direction is a radial direction, and the contacts are formed with a convex inside surface of the heater block body and a concave inside surface of the heater block lid.

15. The method of claim 12, wherein compressing the heating element between the heater block body and the heater block lid compresses the outer diameter of the resistive heating wire in the first direction by about 5% to about 7%.

16. The method of claim 12, wherein the outer protective sheath, the heater block body, and the heater block lid are each made of a high temperature metal or alloy having a coefficient of thermal expansion, the coefficients varying by about 0% to about 10%.

17. The method of claim 12, wherein the heater block body or the heater block lid includes an inner spacer to fill the lateral space around the lateral perimeter of the heating element.

18. The method of claim 12, wherein the attaching the heater block lid to the heater block body comprises fusion welding the heater block lid to the heater block body under compression.

19. The braze-free device of claim 1, wherein the heater block body, the heater block lid, and the heating element together form a heater block, and the heater block has the shape of a plate, a cup, a solid or open cylinder, or a truncated hollow cone.

\* \* \* \* \*